(12) United States Patent
Kumari et al.

(10) Patent No.: US 12,213,038 B2
(45) Date of Patent: Jan. 28, 2025

(54) MULTI-STATIC SENSING COORDINATION

(71) Applicant: QUALCOMM Incorporated, San Diego, CA (US)

(72) Inventors: Preeti Kumari, San Diego, CA (US); Kapil Gulati, Belle Mead, NJ (US); Junyi Li, Fairless Hills, PA (US); Gene Wesley Marsh, San Diego, CA (US); Anantharaman Balasubramanian, San Diego, CA (US); Shuanshuan Wu, San Diego, CA (US)

( * ) Notice: Subject to any disclaimer, the term of this patent is extended or adjusted under 35 U.S.C. 154(b) by 334 days.

(21) Appl. No.: 17/896,982

(22) Filed: Aug. 26, 2022

(65) Prior Publication Data

US 2024/0073659 A1   Feb. 29, 2024

(51) Int. Cl.
*H04W 4/44* (2018.01)
*H04W 4/02* (2018.01)
*H04W 24/10* (2009.01)

(52) U.S. Cl.
CPC ............ *H04W 4/44* (2018.02); *H04W 4/023* (2013.01); *H04W 4/025* (2013.01); *H04W 24/10* (2013.01)

(58) Field of Classification Search
CPC ....... H04W 4/44; H04W 4/023; H04W 4/025; H04W 24/10
See application file for complete search history.

(56) References Cited

U.S. PATENT DOCUMENTS

| | | | | |
|---|---|---|---|---|
| 2022/0070708 A1* | 3/2022 | Nam | ...... | H04L 27/261 |
| 2023/0065713 A1* | 3/2023 | Dai | ...... | G01S 7/006 |
| 2023/0093364 A1* | 3/2023 | Kumari | ...... | G01S 7/006 342/58 |
| 2023/0232199 A1* | 7/2023 | Vassilovski | ...... | H04W 4/90 455/404.1 |
| 2023/0306849 A1* | 9/2023 | Shuman | ...... | G08G 1/096775 |
| 2023/0319527 A1* | 10/2023 | Shuman | ...... | H04W 8/22 370/252 |
| 2024/0073659 A1* | 2/2024 | Kumari | ...... | H04W 24/10 |
| 2024/0089771 A1* | 3/2024 | Landis | ...... | H04W 24/10 |
| 2024/0118364 A1* | 4/2024 | Balasubramanian | ...... | G01S 5/0215 |
| 2024/0206014 A1* | 6/2024 | Xin | ...... | H04W 24/10 |

(Continued)

FOREIGN PATENT DOCUMENTS

KR    20240124139 A   *  8/2024
WO    WO-2023249794 A1 * 12/2023   ............ H04B 7/145

(Continued)

*Primary Examiner* — Adam D Houston

(57) ABSTRACT

Methods, systems, and devices for wireless communications are described. A roadside unit (RSU) may transmit, to a first communication node, a request for multi-static sensing capability information associated with the first communication node. The RSU may receive a report indicating the multi-static sensing capability information for the first communication node. The RSU may transmit, in response to receiving the multi-static sensing capability information, a control message indicating one or more multi-static sensing parameters for the first communication node. The RSU may receive one or more multi-static sensing measurements obtained based at least in part on the one or more multi-static sensing parameters. The RSU may transmit, to the first communication node, a second communication node, or both, one or more channel estimates determined based at least in part on the one or more multi-static sensing measurements.

30 Claims, 16 Drawing Sheets

(56) References Cited

U.S. PATENT DOCUMENTS

| | | | |
|---|---|---|---|
| 2024/0214979 A1* | 6/2024 | Dai | H04W 64/006 |
| 2024/0236655 A1* | 7/2024 | Guo | H04W 8/22 |
| 2024/0236894 A9* | 7/2024 | Bai | H04W 24/08 |
| 2024/0259920 A1* | 8/2024 | Raghavan | H04B 7/0695 |
| 2024/0295626 A1* | 9/2024 | Jiang | H04W 64/00 |

FOREIGN PATENT DOCUMENTS

| | | | | |
|---|---|---|---|---|
| WO | WO-2024052817 A1 * | 3/2024 | | |
| WO | WO-2024100639 A1 * | 5/2024 | | G01S 13/003 |
| WO | WO-2024114930 A1 * | 6/2024 | | G01S 13/765 |
| WO | WO-2024128946 A1 * | 6/2024 | | |
| WO | WO-2024164106 A1 * | 8/2024 | | |

\* cited by examiner

MULTI-STATIC SENSING COORDINATION

FIELD OF TECHNOLOGY

The following relates to wireless communications, including multi-static sensing coordination.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications system, a wireless device may perform radio frequency sensing to aid in communications. However, methods for such sensing schemes may be deficient.

SUMMARY

The described techniques relate to improved methods, systems, devices, and apparatuses that support multi-static sensing coordination. For example, the described techniques provide for a roadside unit (RSU) that may coordinate multi-static sensing in associated with one or more communication nodes. An RSU may transmit, to a first communication node, a request for multi-static sensing capability information associated with the first communication node. The RSU may receive, from the first communication node, a report indicating the multi-static sensing capability information for the first communication node. The RSU may transmit, to the first communication node and in response to receiving the multi-static sensing capability information, a control message indicating one or more multi-static sensing parameters for the first communication node. The RSU may receive, from the first communication node, one or more multi-static sensing measurements obtained based at least in part on the one or more multi-static sensing parameters. The RSU may transmit, to the first communication node, a second communication node, or both, one or more channel estimates determined based at least in part on the one or more multi-static sensing measurements.

A method for wireless communications at a roadside unit (RSU) is described. The method may include transmitting, to a first communication node, a request for multi-static sensing capability information associated with the first communication node, receiving, from the first communication node, a report indicating the multi-static sensing capability information for the first communication node, transmitting, to the first communication node and in response to receiving the multi-static sensing capability information, a control message indicating one or more multi-static sensing parameters for the first communication node, receiving, from the first communication node, one or more multi-static sensing measurements obtained based on the one or more multi-static sensing parameters, and transmitting, to the first communication node, a second communication node, or both, one or more channel estimates determined based on the one or more multi-static sensing measurements.

An apparatus for wireless communications at a roadside unit (RSU) is described. The apparatus may include a processor, memory coupled with the processor, and instructions stored in the memory. The instructions may be executable by the processor to cause the apparatus to transmit, to a first communication node, a request for multi-static sensing capability information associated with the first communication node, receive, from the first communication node, a report indicating the multi-static sensing capability information for the first communication node, transmit, to the first communication node and in response to receiving the multi-static sensing capability information, a control message indicating one or more multi-static sensing parameters for the first communication node, receive, from the first communication node, one or more multi-static sensing measurements obtained based on the one or more multi-static sensing parameters, and transmit, to the first communication node, a second communication node, or both, one or more channel estimates determined based on the one or more multi-static sensing measurements.

Another apparatus for wireless communications at a roadside unit (RSU) is described. The apparatus may include means for transmitting, to a first communication node, a request for multi-static sensing capability information associated with the first communication node, means for receiving, from the first communication node, a report indicating the multi-static sensing capability information for the first communication node, means for transmitting, to the first communication node and in response to receiving the multi-static sensing capability information, a control message indicating one or more multi-static sensing parameters for the first communication node, means for receiving, from the first communication node, one or more multi-static sensing measurements obtained based on the one or more multi-static sensing parameters, and means for transmitting, to the first communication node, a second communication node, or both, one or more channel estimates determined based on the one or more multi-static sensing measurements.

A non-transitory computer-readable medium storing code for wireless communications at a roadside unit (RSU) is described. The code may include instructions executable by a processor to transmit, to a first communication node, a request for multi-static sensing capability information associated with the first communication node, receive, from the first communication node, a report indicating the multi-static sensing capability information for the first communication node, transmit, to the first communication node and in response to receiving the multi-static sensing capability information, a control message indicating one or more multi-static sensing parameters for the first communication node, receive, from the first communication node, one or more multi-static sensing measurements obtained based on the one or more multi-static sensing parameters, and transmit, to the first communication node, a second communication node, or both, one or more channel estimates determined based on the one or more multi-static sensing measurements.

Some examples of the method, apparatuses, and non-transitory computer-readable medium described herein may further include operations, features, means, or instructions for receiving, from the first communication node, a report indicating updated multi-static sensing capability information and transmitting, to the first communication node, an update to the one or more multi-static sensing parameters.

Some examples of the method, apparatuses, and non-transitory computer-readable medium described herein may further include operations, features, means, or instructions for receiving, from the first communication node, node information including location information, mobility information, orientation information, availability information, or any combination thereof, where the one or more multi-static sensing parameters may be selected based on the node information.

Some examples of the method, apparatuses, and non-transitory computer-readable medium described herein may further include operations, features, means, or instructions for receiving, from the first communication node, the one or more multi-static sensing measurements at periodic intervals.

Some examples of the method, apparatuses, and non-transitory computer-readable medium described herein may further include operations, features, means, or instructions for transmitting the request for multi-static sensing capability information based on a trigger event associated with a coverage area of the RSU.

Some examples of the method, apparatuses, and non-transitory computer-readable medium described herein may further include operations, features, means, or instructions for receiving, from the first communication node, one or more communication channel parameters associated with a group of communication nodes, an indication of a scattering element associated with a communication channel, an indication of a blocking element associated with the communication channel, a line of sight indication associated with the communication channel, a travel direction indication, or any combination thereof.

Some examples of the method, apparatuses, and non-transitory computer-readable medium described herein may further include operations, features, means, or instructions for selecting the first communication node as a node for multi-static sensing operations based on a coverage area, a location of the first communication node, an orientation of the first communication node, a communication node location density, a sensing mode to be used for the one or more multi-static sensing measurements, interference associated with the first communication node, or any combination thereof.

Some examples of the method, apparatuses, and non-transitory computer-readable medium described herein may further include operations, features, means, or instructions for selecting the first communication node as a node for multi-static sensing operations based on one or more sensing parameter estimates.

In some examples of the method, apparatuses, and non-transitory computer-readable medium described herein, the multi-static sensing capability information includes sensor capability information, availability information, coverage information, one or more transmission parameters, one or more reception parameters, a sensing mode, or any combination thereof.

In some examples of the method, apparatuses, and non-transitory computer-readable medium described herein, the one or more multi-static sensing parameters include an indication of one or more communication nodes, a sequence of one or more communication nodes, one or more transmission parameters, one or more reception parameters, a data format for channel estimates, an update rate, or any combination thereof.

Some examples of the method, apparatuses, and non-transitory computer-readable medium described herein may further include operations, features, means, or instructions for storing the multi-static sensing capability information in a database of multi-static sensing capability information.

A method for wireless communications at a communication node is described. The method may include receiving, from a roadside unit (RSU), a request for multi-static sensing capability information associated with the communication node, transmitting, to the RSU, a report indicating the multi-static sensing capability information associated with the communication node, receiving, from the RSU, a control message indicating one or more multi-static sensing parameters in response to transmitting the multi-static sensing capability information, and transmitting, to the RSU, one or more multi-static sensing measurements obtained based on the one or more multi-static sensing parameters.

An apparatus for wireless communications at a communication node is described. The apparatus may include a processor, memory coupled with the processor, and instructions stored in the memory. The instructions may be executable by the processor to cause the apparatus to receive, from a roadside unit (RSU), a request for multi-static sensing capability information associated with the communication node, transmit, to the RSU, a report indicating the multi-static sensing capability information associated with the communication node, receive, from the RSU, a control message indicating one or more multi-static sensing parameters in response to transmitting the multi-static sensing capability information, and transmit, to the RSU, one or more multi-static sensing measurements obtained based on the one or more multi-static sensing parameters.

Another apparatus for wireless communications at a communication node is described. The apparatus may include means for receiving, from a roadside unit (RSU), a request for multi-static sensing capability information associated with the communication node, means for transmitting, to the RSU, a report indicating the multi-static sensing capability information associated with the communication node, means for receiving, from the RSU, a control message indicating one or more multi-static sensing parameters in response to transmitting the multi-static sensing capability information, and means for transmitting, to the RSU, one or more multi-static sensing measurements obtained based on the one or more multi-static sensing parameters.

A non-transitory computer-readable medium storing code for wireless communications at a communication node is described. The code may include instructions executable by a processor to receive, from a roadside unit (RSU), a request for multi-static sensing capability information associated with the communication node, transmit, to the RSU, a report indicating the multi-static sensing capability information associated with the communication node, receive, from the RSU, a control message indicating one or more multi-static sensing parameters in response to transmitting the multi-static sensing capability information, and transmit, to the RSU, one or more multi-static sensing measurements obtained based on the one or more multi-static sensing parameters.

Some examples of the method, apparatuses, and non-transitory computer-readable medium described herein may further include operations, features, means, or instructions for receiving, from the RSU, one or more channel estimates determined based on the one or more multi-static sensing measurements.

Some examples of the method, apparatuses, and non-transitory computer-readable medium described herein may further include operations, features, means, or instructions for transmitting, to the RSU, a report indicating updated multi-static sensing capability information and receiving, from the RSU, an update to the one or more multi-static sensing parameters.

Some examples of the method, apparatuses, and non-transitory computer-readable medium described herein may further include operations, features, means, or instructions for transmitting, to the RSU, node information including location information, mobility information, orientation information, availability information, or any combination thereof, where the one or more multi-static sensing parameters may be selected based on the node information.

Some examples of the method, apparatuses, and non-transitory computer-readable medium described herein may further include operations, features, means, or instructions for transmitting, to the RSU, the one or more multi-static sensing measurements at periodic intervals.

Some examples of the method, apparatuses, and non-transitory computer-readable medium described herein may further include operations, features, means, or instructions for transmitting, to the RSU, one or more communication channel parameters associated with a group of communication nodes, an indication of a scattering element associated with a communication channel, an indication of a blocking element associated with the communication channel, a line of sight indication associated with the communication channel, a travel direction indication, or any combination thereof.

In some examples of the method, apparatuses, and non-transitory computer-readable medium described herein, the multi-static sensing capability information includes sensor capability information, availability information, coverage information, one or more transmission parameters, one or more reception parameters, a sensing mode, or any combination thereof.

In some examples of the method, apparatuses, and non-transitory computer-readable medium described herein, the one or more multi-static sensing parameters include an indication of one or more communication nodes, a sequence of one or more communication nodes, one or more transmission parameters, one or more reception parameters, a data format for channel estimates, an update rate, or any combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
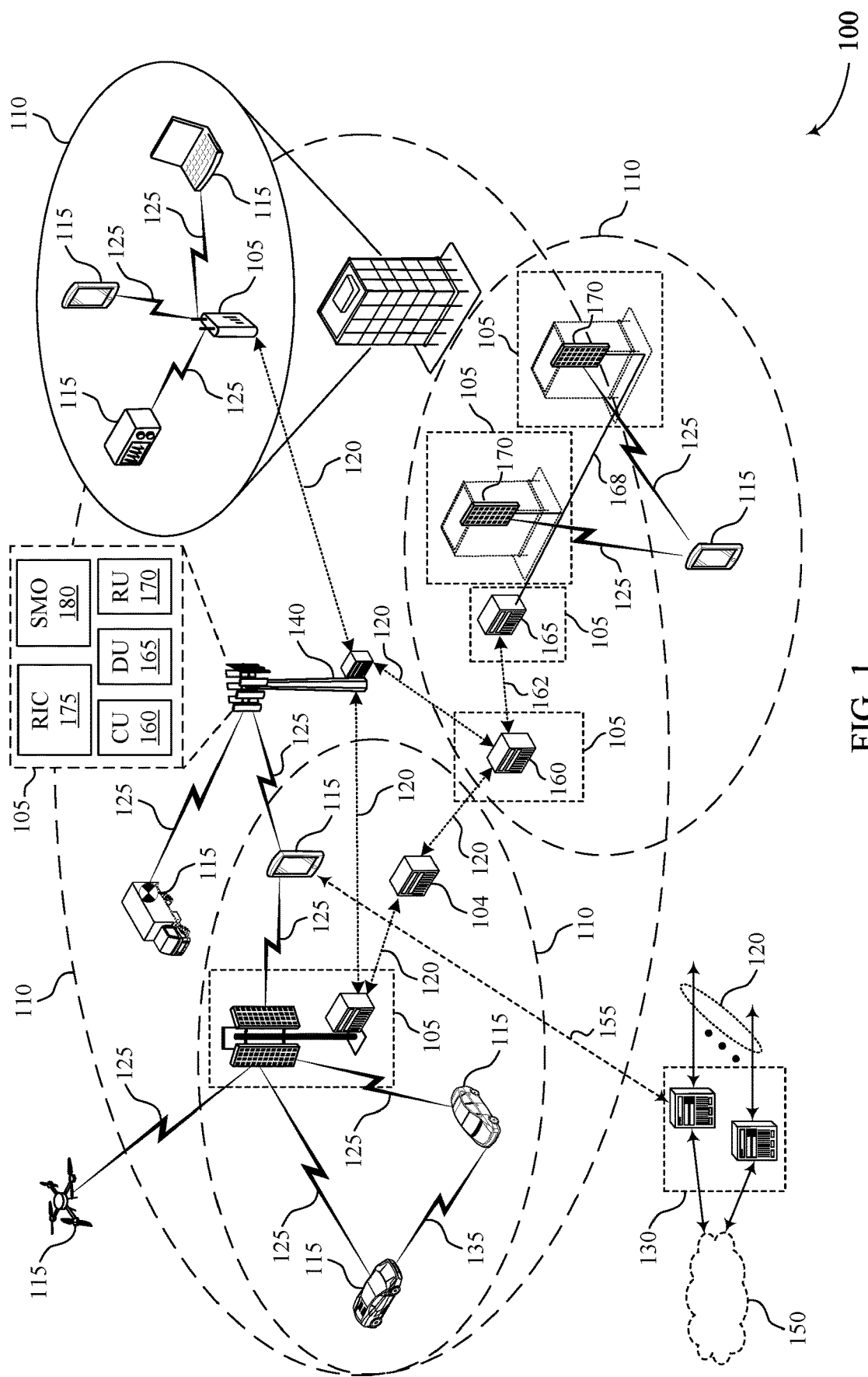
FIG. 1 illustrates an example of a wireless communications system that supports multi-static sensing coordination in accordance with examples described herein.

Wireless communications sometimes involve the use of wireless devices in a mobile context, such as a vehicular environment. Due to vehicular mobility and possibility of blockage from surrounding objects, such wireless devices may suffer reduction in communication capabilities or quality (e.g., intermittent outages or reduced data rate). For example, one vehicle may suddenly accelerate away from another vehicle with which the first vehicle is communication. In another example, another vehicle (e.g., a vehicle not equipped with vehicle to everything (V2X) communications) may move and interrupt or affect a communications channel between vehicles engaging in V2X communication. Some approaches attempt to resolve such issues through additional training for beamforming and communication channel sensing. This, however, may involve additional overhead and a possible reduction in the communication data rate. Additional approaches may include monostatic sensing in which a radio frequency (RF) sensing transmitter and receiver may be co-located (e.g., radar) or passive sensing in which an RF receiver receives a signal transmitted by a RF transmitter that is widely separated from the receiver. However, such approaches provide limited information (e.g., node-specific information or one-way channel information) and are subject to significant measurement path losses, power consumption, and increased interference.

The subject matter described herein includes the use of radio frequency (RF) multi-static sensing to aid in assisting V2X communications for increased throughput, higher reliability, and reduced latency. A roadside unit (RSU) may communicate with various network nodes within the RSU's coverage area, and the network nodes may be equipped with sensing nodes. The RSU may make or collect channel measurements associated with the coverage area (e.g., made at one or more selected remote or co-located network nodes) to assist communications at the network nodes. For example, the RSU may transmit a request for capability information (e.g., detailing RF sensing capabilities of the network node) from a network node, and the network node may response with the requesting capability information. The RSU may transmit parameters for performing multi-static sensing measurements to the network node, and the network node may respond with the multi-static sensing measurements. The RSU may then use the measurements to determine one or more channel estimates, and may transmit the channel estimates to one or more nodes that may utilize the channel estimates to adapt communication parameters with the channel estimates that the network nodes may not otherwise obtain. Such processes may be repeated with other network nodes and the information obtained from various different nodes may be analyzed and combined (e.g., by the RSU) to provide information to various network nodes in the coverage area. In this way, the RSU and the network nodes employ a multi-static sensing approach to improve data rates, latency, and reliability (e.g., due to better blockage predictions, line-of-sight or non-line-of-sight classifications, beam managements, MCS selection, resources allocations, reduced training overhead, or any combination thereof).

Aspects of the disclosure are initially described in the context of wireless communications systems. Aspects of the disclosure are then described in the context of systems and a process flow. Aspects of the disclosure are further illustrated by and described with reference to apparatus diagrams, system diagrams, and flowcharts that relate to multi-static sensing coordination.

FIG. 1 illustrates an example of a wireless communications system 100 that supports multi-static sensing coordination in accordance with examples described herein. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support multi-static sensing coordination as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

A roadside unit (RSU) may transmit, to a first communication node, a request for multi-static sensing capability information associated with the first communication node. In some examples, such a communication node may be an example of a UE 115 as described herein. In some examples, the RSU may be an example of a network entity 105 as described herein. The RSU may receive a report indicating the multi-static sensing capability information for the first communication node. Such capability information may describe one or more capability of the communication node to engage in sensing (e.g., monostatic sensing, bistatic sensing, multi-static sensing, or any combination thereof). The RSU may transmit, in response to receiving the multi-static sensing capability information, a control message indicating one or more multi-static sensing parameters for the first communication node. Such parameters may indicate operations, configurations, information, or any combination thereof that the communication node is to use for obtaining sensing measurements. The RSU may receive one or more multi-static sensing measurements obtained based at least in part on the one or more multi-static sensing parameters. Such measurements may include information such as raw measurements, channel estimates, or any combination thereof. The RSU may transmit, to the first communication node, a second communication node, or both, one or more channel estimates determined based at least in part on the one or more multi-static sensing measurements. In this way the RSU may coordinate multi-static sensing operations with one or more communication nodes to provide additional information (e.g., channel estimates) to the communication nodes that may otherwise be unavailable to the communication nodes.

Figure 2:
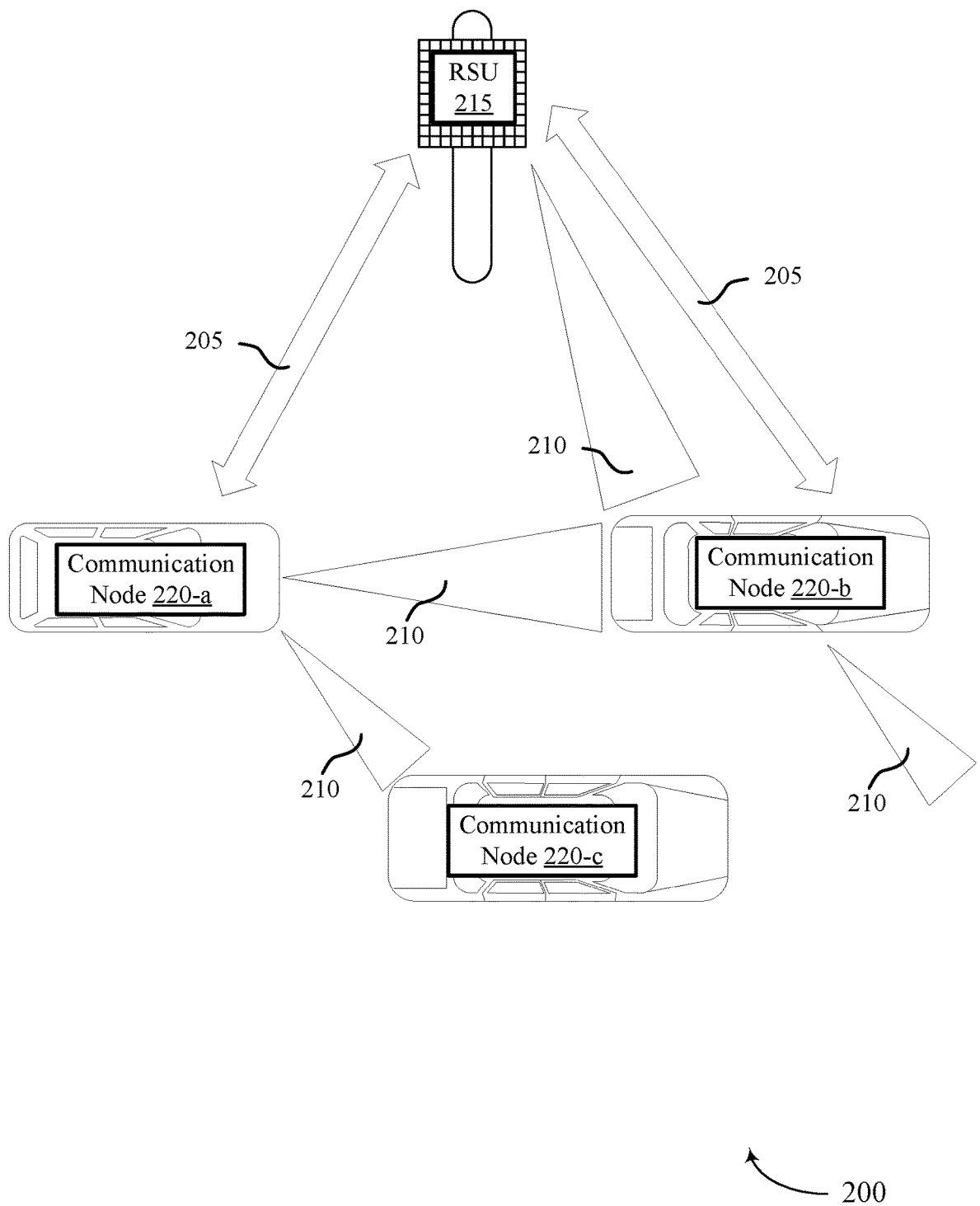
FIG. 2 illustrates an example of a system that supports multi-static sensing coordination in accordance with examples described herein.

FIG. 2 illustrates an example of a system 200 that supports multi-static sensing coordination in accordance with examples described herein.

The system 200 may include an RSU, such as RSU 215. The system 200 may include one or more communication nodes 220, such as communication node 220-a, communication node 220-b, and communication node 220-c. The communication nodes 220-c may transmit one or more sensing signals 210 (e.g., for multi-static sensing as described herein). The RSU 215 may communicate with one or more communication nodes 220 via one or more communication links 205, which may include one or more uplink communication links, one or more downlink communication links, or any combination thereof.

In the course of wireless communications, wireless communication devices may encounter various elements that may influence such communications. A wireless propagation channel between a communications transmitter and a communications receiver may be influenced by one or more effects, including reflection, refraction, diffraction, scattering, or any combination thereof. Reflection or refraction may occur when a smooth object is encountered. An amount of reflected/refracted electromagnetic waves may be a function of the incident polarization, the angle of incidence, or both, as well as the type of the material. The angles and indices of reflection and refraction may be given by Snell's law. Diffraction may include the bending of waves around a corner of an obstacle or through an aperture into the region of geometrical shadow of the obstacle/aperture. Examples of diffraction may include waves bending over the tops of buildings, around street corners, through doorways, or any combination thereof. Scattering may occur when a rough object is encountered. The type and amount of scattering that occurs may depend on an amount of roughness, angle of incidence, wavelength, incident polarization, geometric shape, dielectric properties, or any combination thereof. Additionally or alternatively, some objects may block the propagation path between the communications transmitter and communications receiver. Such physical blockages may present a challenge to reliable communication, especially at higher carrier frequencies (e.g., in a mm wave band). Such wireless propagation channel information may be relevant to adapting communication transmit parameters and to perform received processing with superior channel state information at receive (CSIR). Such adjustments may in turn lead to improvements in throughput, reliability, and latency.

As discussed herein, wireless communications devices may be subject to such effects in a variety of circumstances. One such circumstance discussed in examples herein involves vehicular communications. For example, communication node 220-a and communication node 220-b may have established a communications link (e.g., a high-data rate link, such as in mmWave communications) between them. Since, in this example, communication node 220-a and communication node 220-b are vehicles, they may have a degree of mobility, and surrounding objects (e.g., communication node 220-c) may cause blockage, reflection, or other effects on the communication channel between communication node 220-a and communication node 220-b. For example, a surrounding vehicle (e.g., communication node 220-c) may not have support for communications that communication node 220-a and communication node 220-b may have. If communication node 220-c moves suddenly (e.g., makes a lane-change maneuver), which could possibly disrupt a line-of-sight link between communication node 220-a and communication node 220-b. Additionally or alternatively, communication node 220-b may suddenly accelerate, which may affect the quality of the communication link. As a result of such changes, communication node 220-a, communication node 220-b, or both, may make changes in one or more communications parameters as a result. In some cases, such changes may cause a significant reduction in communications capability (e.g., intermittent outage, reduced data rate, other effects, or any combination thereof). Some approaches may involve additional operations (e.g., beamforming and communication channel sensing), which may increase overhead and decrease a communication data rate.

To reduce or eliminate the deficiencies or limitations discussed herein, approaches for multi-static sensing may be employed, including the example depicted in FIG. 2. In the system 200, the RSU 215 may communicate with one or more communication nodes 220 (e.g., that are within the coverage area of the RSU 215). Such communication nodes 220 may be equipped with communication devices, and may further be equipped with one or more sensing nodes. Such sensing nodes may include a sensing transmitter, a sensing receiver, or both. The system 200 may therefore include several co-located nodes, remote sensing nodes, or both, and such nodes may share a common coverage area with a coverage area associated with or covered by the communication nodes 220 s. The RSU 215 may make its own sensing measurements, collect sensing measurements provided by other nodes (e.g., communication nodes 220), or both. For example, the RSU 215, the communication nodes 220, or both may transmit sensing signals 210 to determine or obtain one or more sensing measurements. The RSU 215 may use such information to assist nodes within the coverage area, such as the communication nodes 220. For example, the RSU 215 may provide information related to resource allocation, space-time-frequency transmit precoding, beam management, selection between multiple sidelink interfaces, selection between a sidelink interface and a Uu interface, or any combination thereof. Additionally or alternatively, the communication nodes 220 may receive the multi-static sensing estimate(s) prepared by the RSU and may combine such information with sensing performed at the communication nodes 220 to adapt communication parameters (e.g., transmission parameters, reception parameters, processing parameters, or any combination thereof), thereby providing improved channel state information (e.g., channel state information at receive (CSIR)).

For example, the RSU 215 may transmit a request for multi-static sensing capability information to the communication nodes 220. Since different communication nodes 220 may have different capabilities, the RSU 215 requests this information to take such capabilities into account for other operations (e.g., determining or transmitting multi-static sensing parameters to the communication nodes 220). The communication nodes 220 may receive such a request and may further transmit one or more indications of their capabilities to the RSU 215. For example, such capabilities may include transmission, reception, or both, of sensing signals. The RSU 215 may receive such capability indications, and may transmit (e.g., in a control message) an indication of one or more multi-static sensing parameters (e.g., for one or more of the communication nodes 220). Such parameters may include parameters associated with the sensing operations (e.g., a signal strength, a signal direction, a signal type, or other parameters). The communication nodes 220 may receive such indications or control messages, and may obtain one or more measurements (e.g., based on the received parameters). For example, the communication nodes 220 may perform one or more sensing operations (e.g., transmitting a sensing signal, receiving a sensing signal, or both). The communication nodes may transmit one or more of these obtained measurements or other measurements to the RSU 215 for further processing. The RSU 215 may determine or obtain one or more channel estimates for one or more channels associated with the RSU 215 or an associated coverage area. For example, the RSU 215 may use the obtained measurements to determine channel estimates for a communication channel between two communications nodes 220. In this way, the system 200 may engage in sensing operations for assisting communications (e.g., in vehicular or other environments).

Figure 3:
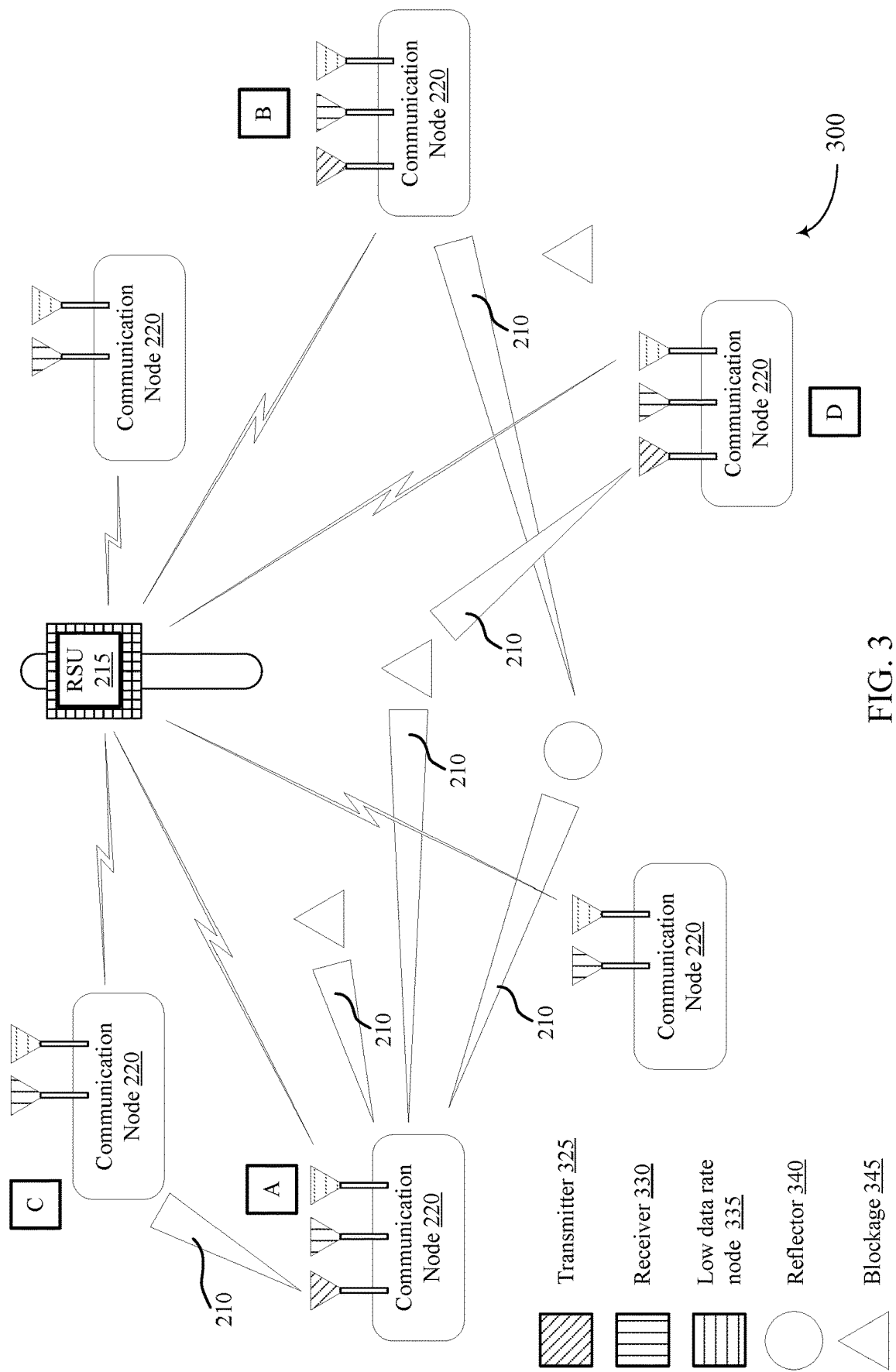
FIG. 3 illustrates an example of a system that supports multi-static sensing coordination in accordance with examples described herein.

FIG. 3 illustrates an example of a system 300 that supports multi-static sensing coordination in accordance with examples described herein. The system 300 may include the RSU 215 and one or more communication nodes 220. As discussed herein, wireless devices (e.g., those included in the system 300) may operate in various environments, and such environments may include objects that may affect communication or sensing channels. For example, the environment may include reflectors 340, blockages 345, or both.

Approaches to sensing (e.g., RF sensing) may involve different approaches. Some approaches may involve monostatic sensing, in which the transmitter 325 and the receiver 330 may be co-located (e.g., radar). For example, the communication node 220 at point A may transmit a sensing signal 210 using a transmitter 325, and may determine that there is a blockage using its receiver 330. Some approaches may involve bistatic sensing, in which a transmitter 325 and a receiver 330 may be widely separated (e.g., passive sensing). For example, the communication node 220 at point A may transmit a sensing signal 210 which may be received by the communication node 210 at point B (e.g., after being reflected by a reflector 340). Some approaches may involve multi-static sensing or multi-static sensing networks, in which multiple transmitters 325 and receivers 330 may be co-located, widely separated, or both, within a shared area of coverage. Such an approach may involve spatially diverse monostatic and bistatic sensing components. The system 300 may be an example of a multi-static sensing approach. In some examples of such approaches, one or more communication nodes 220 may employ the use of low data rate nodes 335. The communication nodes 220 may use such low data rate nodes for communications (e.g., with another communication node 220 or the RSU 215).

Additionally or alternatively, in such multi-static sensing approaches, one point may be a coordinating point, such as the RSU 215. The RSU 215 may collect measurements made throughout the system 300 and may determine one or more channel estimates for the various communications channels involved in the system 300. The RSU 215 may transmit the channel estimates to the various communications nodes 220. In this way, the communications nodes 220 may receive the benefit of measurements made by other communications nodes 220 and obtain information (e.g., channel estimates) that may not have been otherwise available.

Some approaches have employed sensing (e.g., monostatic sensing, in which a sensing node, such as radar, and a communications node are co-located) in attempts to resolve such situations. In such sensing approaches, a single node may obtain sensing results and may therefore obtain some understanding or information about a communications channel. Such information may be used to decrease overhead (e.g., training overhead) for communications beamforming.

However, such approaches may also bear limitations. For example, radar sensing provides monostatic sensing, while communications may employ bistatic channel state information. Additionally or alternatively, a co-located sensing unit may obtain line-of-sight target parameters thereby limiting usefulness in non line-of-sight applications. Additionally or alternatively, mono-static sensing (e.g., radar) includes a two-way path loss (e.g., both transmission of the initial signal, and then reception of the reflected or otherwise affected signal) and may suffer from a low signal-to-noise ratio. Additionally or alternatively, there may be low correlation between a monostatic radar cross section (RCS) and a bistatic RCS. This may lead to a loss in amplitude information of one or more channel taps and, in some cases, scattering elements present in the bistatic channel may not be detected. Additionally or alternatively, velocity estimation may be limited to a radial direction. Additionally or alternatively, a co-located radar may use active sensing, which may involve increased power consumption, increased radar interference, other adverse effects, or any combination thereof.

To reduce or eliminate such deficiencies, multi-static sensing may be employed. Such multi-static sensing network (e.g., the system 300) may lead to denser point clouds, higher channel estimation accuracy, better classification, association, boundary detection, or any combination thereof. Further, such approaches may offer improved association and correlation with communication channels (e.g., a communication channel between the communication node 220 at point A and the communication node 220 at point B), which may be due at least in part on a larger coverage area, a spatially diverse radar cross section, rich scattering characteristics, a distributed radial velocity, less interference, less power consumption (e.g., due to the use of passive receivers, instead of using co-located radars in the network), other characteristics or improvements, or any combination thereof. Such approaches may further improve data rates, latency, reliability, other improvements, or any combination thereof due to improved blockage prediction, line-of-sight vs. non line-of-sight classification, beam management, MCS selection, resource allocation, reduced training overhead, other improvements, or any combination thereof.

For example, the RSU 215 may identify potential remote RF sensing nodes (e.g., communication nodes 220, which may be monostatic transmit/receive, bistatic/multi static transmit, or bistatic/multi static receive) to assist in communications (e.g., V2X communications). The communication nodes 220 may transmit their capabilities (e.g., either periodically or event triggered) along with their request for information transfer (e.g., an aggregated multi static channel estimate) from RSU. The RSU 215 may determine to gather multi static sensing estimates either for global considerations or for specific considerations between a cluster of a few communication nodes 220. In some examples, the RSU 215 may employ an optimization or improvement approach to choose locations, orientations, modes (e.g., monostatic, bistatic, or multi static), update rate, other parameters, or any combination thereof of RF sensing nodes.

The RSU 215 may transmit the sensor use request along with one or more suggested configurations, one or more required configurations, or any combination thereof to the chosen sensing nodes (e.g., via co located communicating UE nodes). One or more communications nodes 220 (e.g., those that receive the sensor use request) may configure one or more co-located sensors accordingly and may further transmit an acknowledgement (e.g., to the RSU 215 or other entity). Additionally or alternatively, the communications nodes 220 may transmit one or more specifications that the communications nodes 220 can provide (either individually or collectively).

The RSU 215 may receive the acknowledgement, the configurations, or both, and the RSU 215 may perform revised resource allocation for the sensor nodes. Additionally or alternatively, The RSU 215 may enter a "ready" mode to perform its own sensing operations. Such sensing operations may either employ its own co-located monostatic sensor or sensors or may act as a bistatic or multi-static transmitter (e.g., where the other remote sensing node(s) will act as bistatic or multi-static multi receiver), a bistatic multi-static receiver (e.g., where the other remote sensing node(s) will act as bistatic multi static transmitters), or any combination thereof.

The RSU 215 may gather the information from the chosen nodes (e.g., remote, co-located, or both). Then, the RSU 215 may process the information to extract one or more channel estimates (e.g., multi static sensing estimates), additional information (e.g., related to situational awareness), or any combination thereof. The RSU 215 may then transmit part or all of such information to one or more of the communication nodes 220. For example, the RSU 215 may transmit a channel estimate to one or more communications nodes 220 that are using the associated communication channel.

Figure 4:
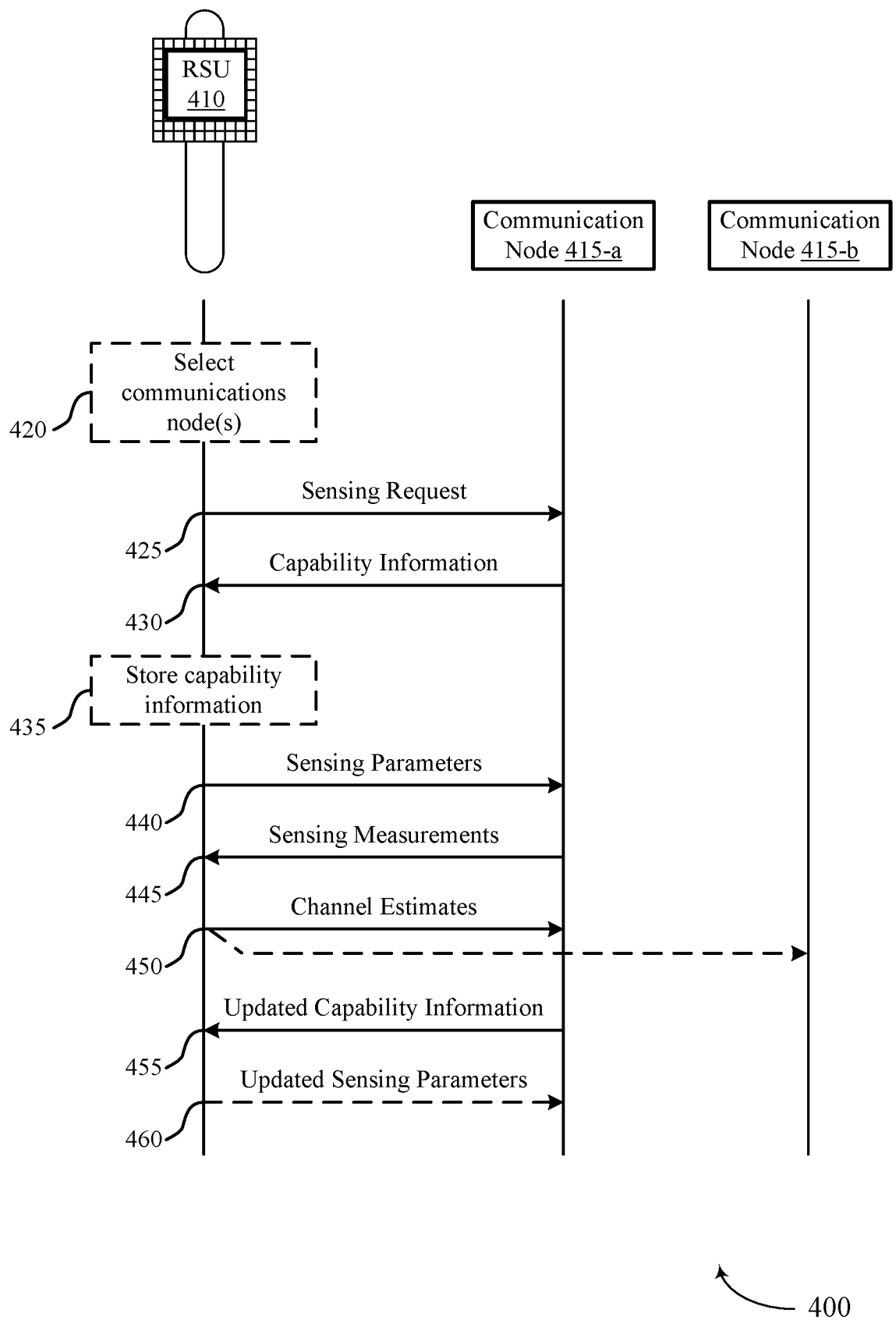
FIG. 4 illustrates an example of a process flow that supports multi-static sensing coordination in accordance with examples described herein.

FIG. 4 illustrates an example of a process flow 400 that supports multi-static sensing coordination in accordance with examples described herein. The process flow 400 may implement various aspects of the present disclosure described with reference to FIGS. 1-3. The process flow 400 may include RSU 410 and communication nodes 415, which may be examples of similarly named elements as described with reference to FIGS. 1-3.

In the following description of the process flow 400, the operations between the RSU 410 and the communication nodes 415 is performed in different orders or at different times. Some operations may also be left out of the process flow 400, or other operations may be added. Although the RSU 410 and the communication nodes 415 are shown performing the operations of the process flow 400, some aspects of some operations may also be performed by other elements of the process flow 400 or by elements that are not depicted in the process flow, or any combination thereof.

At 420, the RSU 410 may select the first communication node as a node for multi-static sensing operations based on a coverage area, a location of the first communication node, an orientation of the first communication node, a communication node location density, a sensing mode to be used for the one or more multi-static sensing measurements, interference associated with the first communication node, or any combination thereof. Additionally or alternatively, the RSU 410 may select the first communication node as a node for multi-static sensing operations based on one or more sensing parameter estimates.

For example, the RSU 410 may identify potential remote RF sensing nodes. The RSU 410 may announce a sensing service request periodically in an associated coverage area. In some examples, events may also trigger such a discovery phase (e.g., an increase in congestion or mobility). Such remote RF sensing nodes (e.g., the communication nodes 415) may be remote nodes, infrastructure radio-head nodes, mobile nodes (e.g., sensing nodes mounted on vehicles), RSU-mounted or associated co-located nodes.

In some examples, the RSU 410 may determine to gather multi static sensing estimates either for global considerations or for specific considerations between a cluster of a few communication nodes 415. For example, a global sensing mode may be employed. Such a global sensing mode may be for communicating nodes in a coverage area (e.g., the communication nodes 415). A global sensing mode may aid in reducing power consumption, use of space time frequency resources, or both, for RF sensing nodes. Such a global sensing mode may provide a coarse channel estimate and situational awareness to several communicating users within a coverage area (e.g., in dynamic vehicular environments). In some examples, measurements and reporting thereof may be done periodically. In such cases, an update rate may depend on or may be based on one or more factors, such as congestion, mobility, location (e.g., a traffic prone location vs. a location with little traffic that may be determined relative to a threshold), dense or sparse scattering (e.g., which may be determined relative to a threshold), day, time, or any combination thereof. In some examples, measurements and reporting thereof may be event triggered (e.g., when a vehicle enters or exists in a coverage area of the RSU 410 or when an accident occurs). Such global sensing information may produce an indication of a direction of traffic flow and may aid in proactively adapting space time frequency resource allocation.

In some examples, a specific or local sensing mode may be employed. Such an approach may involve a cluster of multiple nodes that may be related in some way (e.g., in a geographic area, in a coverage area of a RSU or a network entity, belonging to a grouping of nodes, other relationships, or any combination thereof). Such an approach may involve assisting communications between two communication nodes 415. Such an approach may aid in estimating communication channel parameters, link establishment, adaptively adjusting transmit parameters, other operations, or any combination thereof).

In some examples, a global sensing mode and a specific or local sensing mode may be employed independently or may be employed cooperatively. For example, a specific sensing mode may be used after the use of a global sensing mode for a fine channel estimate and (more) accurate situational awareness that may be specific to one or more considerations of the few concerned communicating nodes. Additionally or alternatively, a global sensing mode may be triggered after specific sensing modes have been carried over for different clusters of a few communicating nodes. Such an approach may aid in addressing common sensing requests used by each of these communicating node clusters.

In some examples, the RSU 410 may determine to gather multi static sensing estimates either for global considerations or for specific considerations between a cluster of a few communication nodes 415. In some approaches, the RSU 410 may employ an improvement or adjustment approach for selecting locations, orientations, modes (e.g., monostatic, bistatic, or multi-static), an update rate for sensing nodes, or any combination thereof.

In some examples, the improvement or adjustment approach may depend or be based on whether a collection mode being used is a global sensing mode or a specific/local mode. For a global sensing mode, locations, orientations, or both may be chosen to support coarse channel estimation and situational awareness, and may, additionally or alternatively, be chosen to support a wide coverage area (e.g., determined in relation to a threshold). In such an approach, the sensors' locations may be widely separated (e.g., low effective sensor network density) within a large coverage area (e.g., redundancy of sensing the same environment may be avoided). Transmit parameters, reception parameters, or both may be chosen to allow for coarse estimation (e.g., such as low update rate, small bandwidth, sweeping beams) with low power consumption and reduced space time frequency resources.

For a specific/local sensing mode, locations, orientations, or both may be chosen to support fine channel estimate and accurate situational aw awareness mode for a given cluster of a few communicating nodes. In some examples, the sensors' location (e.g., density, distribution, or both) may be chosen specific to the location, mobility, or both of the few concerned communicating nodes (e.g., such as the ones between their locations). In some examples, selection of the sensors may involve consideration of a trade-off or balance between detection (e.g., outage or diversity) and estimation (e.g., accuracy or redundancy) performance. In some cases, transmit parameters, reception parameters, or both may be chosen to allow for fine estimation. (e.g., high update rate, large bandwidth, other considerations, or any combination thereof).

In some examples, sensing nodes may be chosen to avoid causing unfavorable interference between sensing nodes (e.g., by emphasizing the use of multi-static sensing over separate monostatic sensing).

In some examples, improvement or adjustment may be based on one or more sensing parameter estimates (e.g., range, Doppler parameters, angle, other information, or any combination thereof), quality indications (e.g., key performance indicators, such as misdetection information, false alarm information, estimation accuracy information, latency information, or any combination thereof) of sensing parameter estimates, one or more types of information quantization or compression of channel estimates, other factors, or any combination thereof. In some examples, improvement or adjustment may also be based on mobility, congestion, a measure of how dynamic an environment may be, application requirements, event considerations, priority considerations, other factors, or any combination thereof. For example, in a situation with heavy local congestion with high communication needs in a complex and dynamic vehicular environment, the selection of the sensing nodes may be constrained by the high demand of space time frequency resources used for communication data transmission. In such a case, a specific sensing mode may be utilized more often, optionally with an intermittent global sensing mode for reduced overhead. Other combinations or configurations of sensing modes may also be employed, and are contemplated by the subject matter disclosed herein. In another example, if there is not much communication traffic, but lots of objects (e.g., pedestrians or bicyclists) are moving, then multi-static sensing needs may be increased with a higher update rate.

At 425, the RSU 410 may transmit, to a first communication node, a request for multi-static sensing capability information associated with the first communication node. In some examples, the RSU 410 may transmit the request for multi-static sensing capability information based on a trigger event associated with a coverage area of the RSU.

At 430, the RSU 410 may receive, from the first communication node, a report that may indicate the multi-static sensing capability information for the first communication node. In some examples, the RSU 410 may receive, from the first communication node, node information that may include location information, mobility information, orientation information, availability information, or any combination thereof. In some examples, the one or more multi-static sensing parameters may be selected based on the node information. In some examples, the multi-static sensing capability information may include sensor capability information, availability information, coverage information, one or more transmission parameters, one or more reception parameters, a sensing mode, or any combination thereof.

For example, remote sensing nodes (e.g., the communication nodes 415) with communication capability may respond back with their sensor capabilities, availability schedule, or other capabilities. Additionally or alternatively, the communication nodes 4145 may transmit a request for information transfer (e.g., such as aggregated multi-static channel estimates).

In some examples, the communication nodes 415 may transmit node information, such as a location (e.g., a GPS location description or other location description), mobility information, orientation information, availability information, or any combination thereof. In some examples, a communication node 415 may transmit a sensing capability (e.g., along with tag of whether it is reconfigurable or static). Such capability information may include coverage information, such as a field of view, a range (e.g., maximum, minimum, average, or both), a velocity (e.g., maximum, minimum, average, or any combination thereof). In some examples, the communication nodes 415 may transmit transmission/reception parameters (e.g., optionally along with a tag indicating whether one or more such parameters are reconfigurable or static), a transmit power, a duty cycle, a waveform, one or more beamforming parameters, an update rate, a scanning mode, a tracking mode, tracking mode, other capabilities, or any combination thereof.

In some examples, the communication nodes 415 may transmit a sensing capability mode. For example, the mode may be a monostatic mode in which the communication node 415 does its own sensing (e.g., with co located transmission and reception) and sends (e.g., to the RSU 410) raw reception data, processed channel estimates, or any combination thereof. Additionally or alternatively, the mode may be a multi-static transmit sensing mode in which the communication node 415 acts as an active transmit node (e.g., with or without a co located reception node(s)). In some examples, a synchronization procedure might be used between one or more nodes for multi static sensing. Additionally or alternatively, the mode may be a multi-static sensing reception mode in which the communication node 415 may act as a passive or active receiver (e.g., with or without a co-located transmit node(s). In some examples, a synchronization procedure might be used between one or more nodes for multi static sensing. Further, a communication nodes 415 operating in such a manner may transmit raw reception data, one or more processed channel estimates, or any combination thereof (e.g., to the RSU 410).

In some examples, the communication nodes 415 may transmit performance information, (e.g., key performance indicators) such as misdetection information, false alarm information, estimation accuracy information, latency information, or any combination thereof. In some examples, the communication nodes 415 may transmit communication capability information (e.g., information associated with a communication capability of a communication element of the communication node 415), which may include a data rate, latency, a block error rate, other performance information, or any combination thereof.

In some examples, the communication nodes 415 may transmit RF sensing information. Such RF sensing information may be either raw or processed data and may be provided in a preconfigured format or in a format dynamically selected or defined by the RSU 410.

In some examples, the communication nodes 415 may transmit a request for information transfer, which may include aggregated multi-static sensing channel estimates. Such requests may be made to the RSU 410 or may be made to another entity.

At 435, the RSU 410 may store the multi-static sensing capability information in a database of multi-static sensing capability information. For example, the RSU 410 may register the interested RF sensing nodes for gathering multi multi-static channel estimates.

At 440, the RSU 410 may transmit, to the first communication node and in response to receiving the multi-static sensing capability information, a control message that may indicate one or more multi-static sensing parameters for the first communication node. In some examples, the one or more multi-static sensing parameters include an indication of one or more communication nodes, a sequence of one or more communication nodes, one or more transmission parameters, one or more reception parameters, a data format for channel estimates, an update rate, or any combination thereof.

For example, the RSU 410 may indicate or specify a format for reporting back sensing parameter estimates or measurements. Such information may relate to the format, or may relate generally to the sensing measurements. Information transmitted from the communication nodes 415 to the RSU 410 may include sensing parameters (e.g., range, angle, Doppler parameters, object boundary boxes, or any combination thereof). Such information may further include an amount of quantization or compression, which may be associated with a sensing overhead. Additionally or alternatively, such information may include a data format to be used to send the sensing information.

In some examples, the RSU 410 may transmit a sensor use request along with one or more suggested configurations, one or more required configurations, or any combination thereof to the chosen sensing nodes (e.g., via co located communicating UE nodes). The RSU 410 may transmit an indication (e.g., an optional configuration) of which equipment (e.g., radio heads or locations of radio heads) may be employed for a given communication node 415. For example, the RSU 410 may provide an activation sequence (e.g., on/off events over time) which may be based on the mobility of concerned remote communicating nodes. Additionally or alternatively, The RSU 410 may provide transmission parameters, reception parameters, or both for radio heads. Additionally or alternatively, The RSU 410 may transmit one or more reception configurations or indications. Additionally or alternatively, The RSU 410 may transmit an indication of a data format (e.g., for reporting back the sensing parameter estimates or measurements).

At 445, the RSU 410 may receive, from the first communication node, one or more multi-static sensing measurements obtained based on the one or more multi-static sensing parameters. In some examples, the RSU 410 may receive, from the first communication node, the one or more multi-static sensing measurements at periodic intervals. In some examples, the RSU 410 may receive, from the first communication node, one or more communication channel parameters associated with a group of communication nodes, an indication of a scattering element associated with a communication channel, an indication of a blocking element associated with the communication channel, a line-of-sight indication associated with the communication channel, a travel direction indication, or any combination thereof.

For example, the RSU 410 may gather the information from the chosen nodes (e.g., remote, co-located, or both). Then, the RSU 215 may process the information to extract one or more channel estimates (e.g., multi static sensing estimates), additional information (e.g., related to situational awareness), or any combination thereof. Such processing may result in various types of information, including communication channel parameters (e.g., parameters associated with one or more communication nodes 415, which may include a delay Doppler angular profile, scattering detection, a channel amplitude profile, or any combination thereof), information about scattering elements (e.g., location, orientation, mobility, or any combination thereof of potential scatterers, which may be beneficial for reflection operations optionally involving metallic objects with large surfaces that may aid better propagation), information about blocking elements (e.g., location, mobility, other information, or any combination thereof), a line-of-sight or non line-of-sight indication, a direction of traffic flow or movement (e.g., for objects both equipped or not equipped with communicating UE nodes), improvement or adjustment of RF sensing nodes to assist communications in vehicular environments (e.g., such as for tracking mode), additional information, or any combination thereof.

At 450, the RSU 410 may transmit, to the first communication node, a second communication node, or both, one or more channel estimates determined based on the one or more multi-static sensing measurements.

At 455, the RSU 410 may receive, from the first communication node, a report that may indicate updated multi-static sensing capability information. For example, registered RF sensing nodes (e.g., the communication nodes 415) may update (either periodically or event event-triggered) their sensor capabilities, availability schedule, information requests, or any combination thereof.

At 460, the RSU 410 may transmit, to the first communication node, control signaling that may indicate an update to the one or more multi-static sensing parameters.

Figure 5:
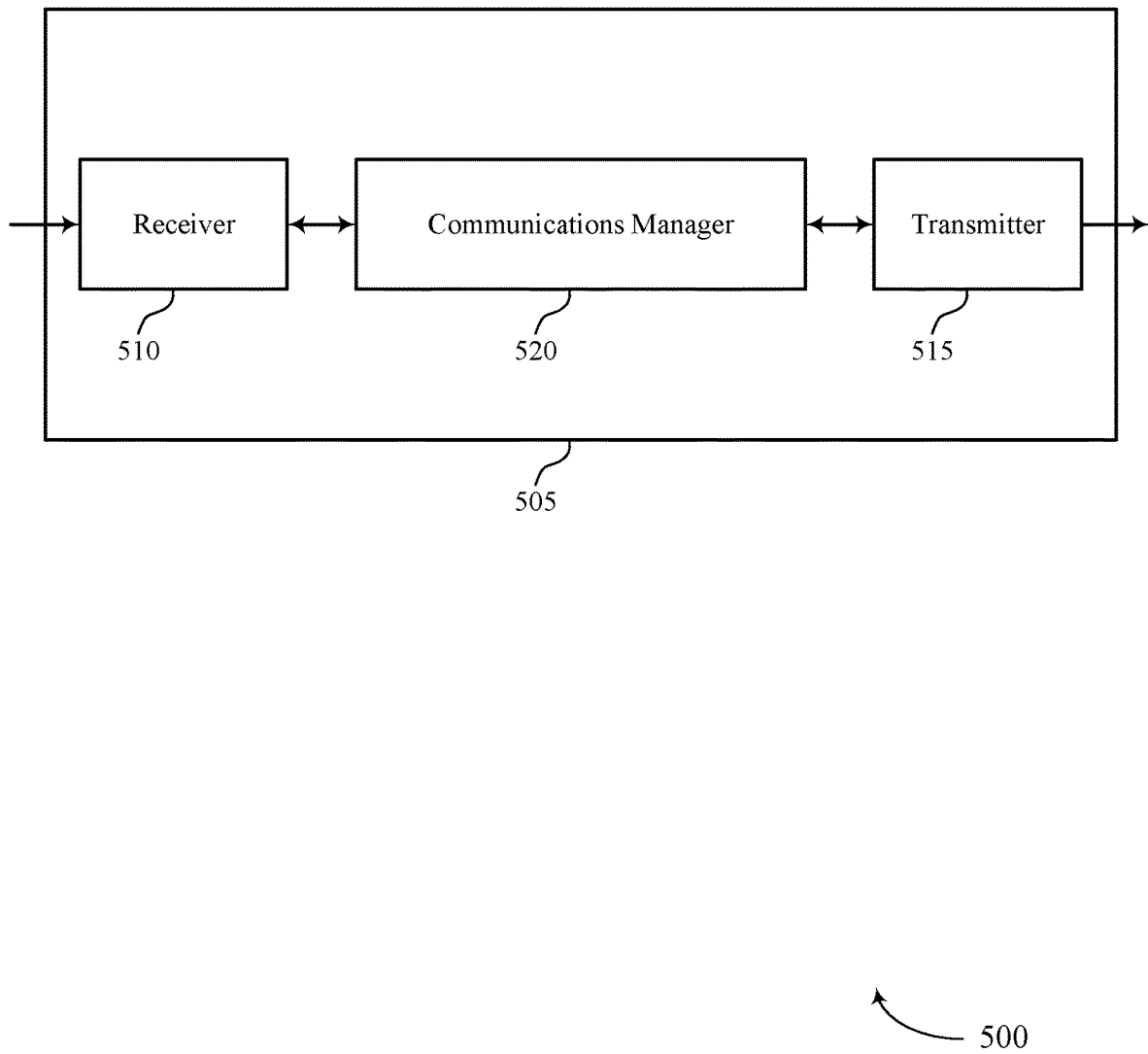
FIGS. 5 and 6 show block diagrams of devices that support multi-static sensing coordination in accordance with examples described herein.

FIG. 5 shows a block diagram 500 of a device 505 that supports multi-static sensing coordination in accordance with examples described herein. The device 505 may be an example of aspects of a roadside unit as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to multi-static sensing coordination). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to multi-static sensing coordination). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of multi-static sensing coordination as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

Additionally, or alternatively, the communications manager 520 may support wireless communications at a roadside unit (RSU) in accordance with examples as disclosed herein. For example, the communications manager 520 may be configured as or otherwise support a means for transmitting, to a first communication node, a request for multi-static sensing capability information associated with the first communication node. The communications manager 520 may be configured as or otherwise support a means for receiving, from the first communication node, a report indicating the multi-static sensing capability information for the first communication node. The communications manager 520 may be configured as or otherwise support a means for transmitting, to the first communication node and in response to receiving the multi-static sensing capability information, a control message indicating one or more multi-static sensing parameters for the first communication node. The communications manager 520 may be configured as or otherwise support a means for receiving, from the first communication node, one or more multi-static sensing measurements obtained based on the one or more multi-static sensing parameters. The communications manager 520 may be configured as or otherwise support a means for transmitting, to the first communication node, a second communication node, or both, one or more channel estimates determined based on the one or more multi-static sensing measurements.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption, more efficient utilization of communication resources, or a combination thereof.

Figure 6:
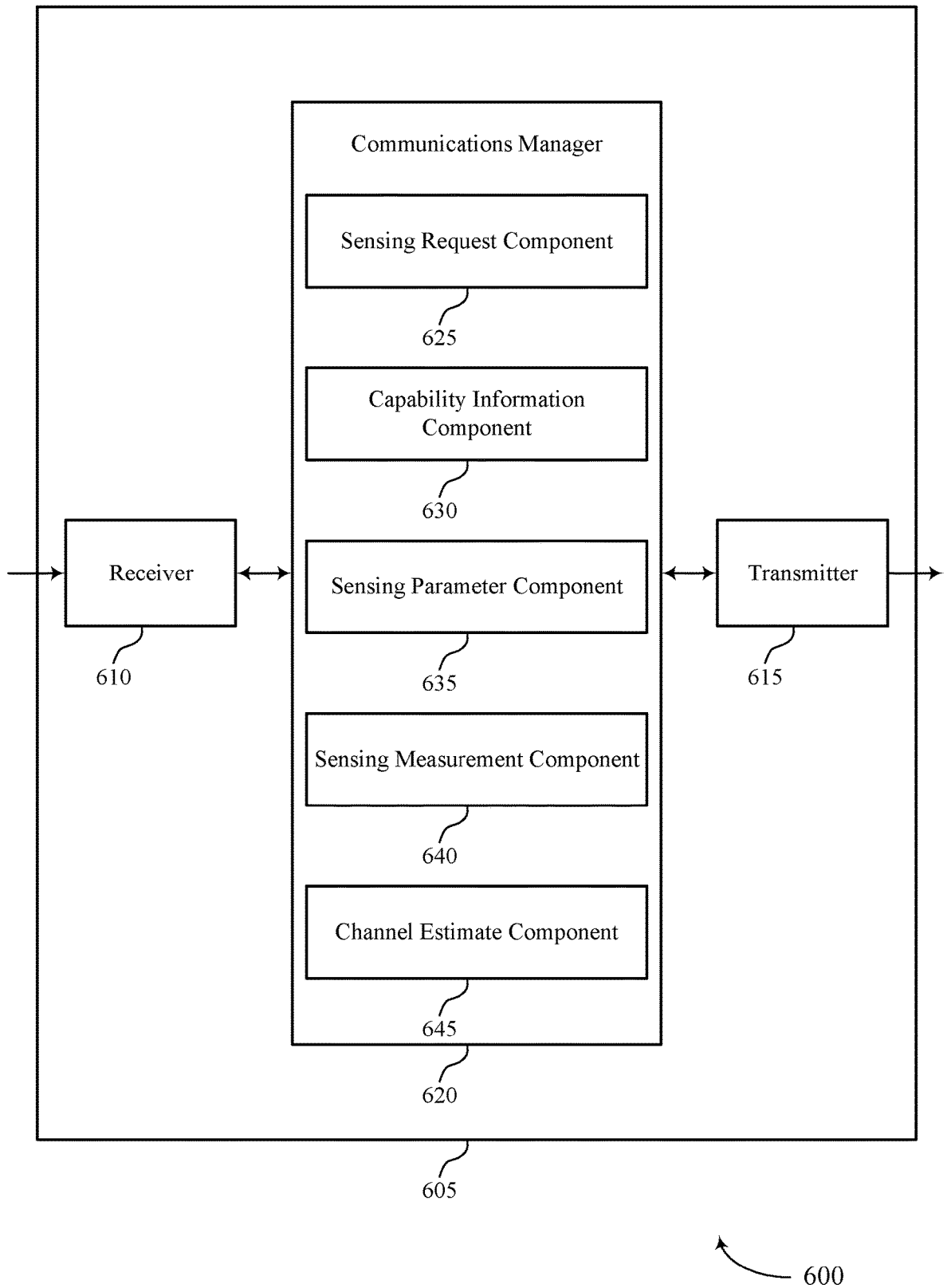

FIG. 6 shows a block diagram 600 of a device 605 that supports multi-static sensing coordination in accordance with examples described herein. The device 605 may be an example of aspects of a device 505 or a roadside unit 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to multi-static sensing coordination). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to multi-static sensing coordination). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of multi-static sensing coordination as described herein. For example, the communications manager 620 may include a sensing request component 625, a capability information component 630, a sensing parameter component 635, a sensing measurement component 640, a channel estimate component 645, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a roadside unit (RSU) in accordance with examples as disclosed herein. The sensing request component 625 may be configured as or otherwise support a means for transmitting, to a first communication node, a request for multi-static sensing capability information associated with the first communication node. The capability information component 630 may be configured as or otherwise support a means for receiving, from the first communication node, a report indicating the multi-static sensing capability information for the first communication node. The sensing parameter component 635 may be configured as or otherwise support a means for transmitting, to the first communication node and in response to receiving the multi-static sensing capability information, a control message indicating one or more multi-static sensing parameters for the first communication node. The sensing measurement component 640 may be configured as or otherwise support a means for receiving, from the first communication node, one or more multi-static sensing measurements obtained based on the one or more multi-static sensing parameters. The channel estimate component 645 may be configured as or otherwise support a means for transmitting, to the first communication node, a second communication node, or both, one or more channel estimates determined based on the one or more multi-static sensing measurements.

Figure 7:
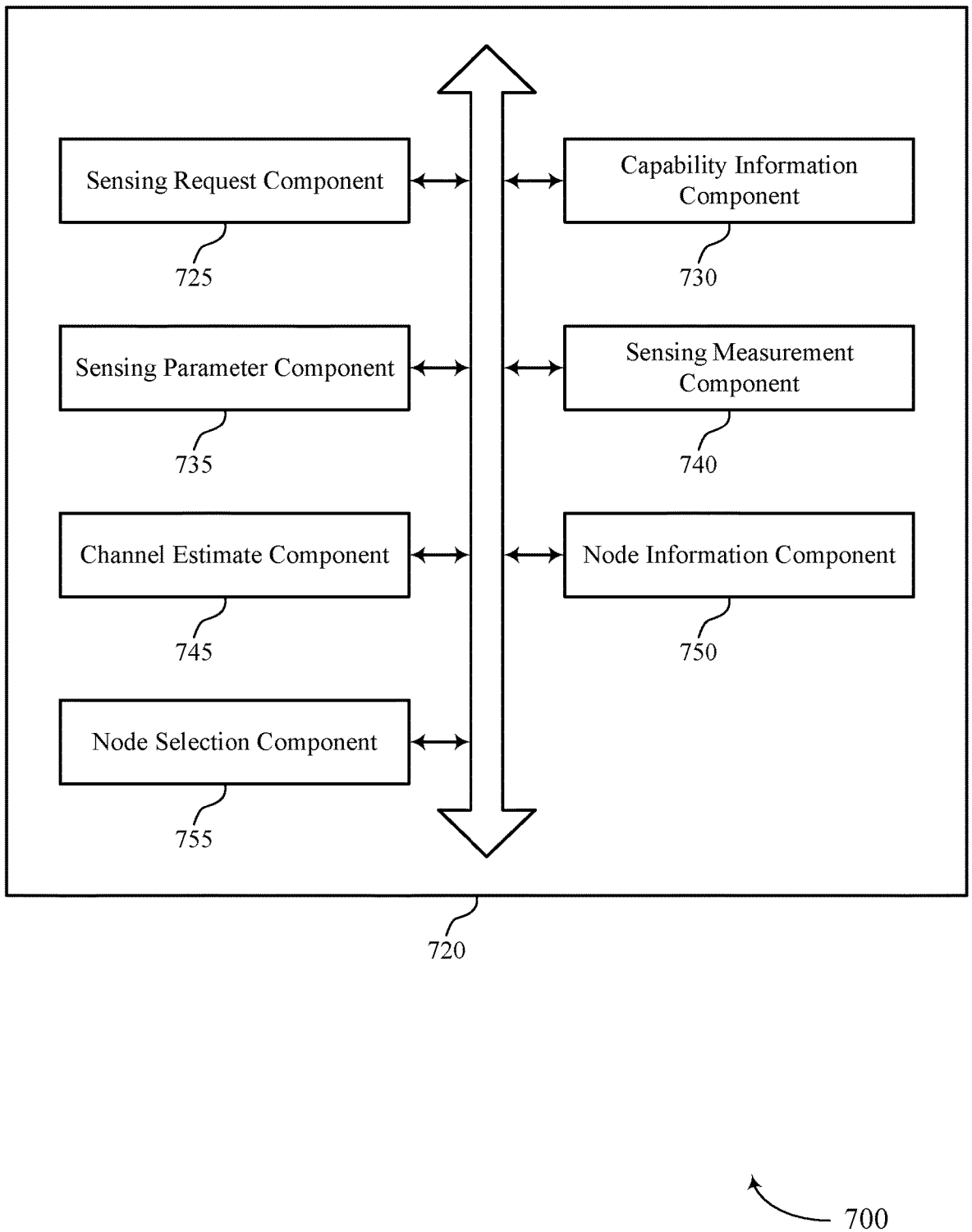
FIG. 7 shows a block diagram of a communications manager that supports multi-static sensing coordination in accordance with examples described herein.

FIG. 7 shows a block diagram 700 of a communications manager 720 that supports multi-static sensing coordination in accordance with examples described herein. The communications manager 720 may be an example of aspects of a communications manager 520, a communications manager 620, or both, as described herein. The communications manager 720, or various components thereof, may be an example of means for performing various aspects of multi-static sensing coordination as described herein. For example, the communications manager 720 may include a sensing request component 725, a capability information component 730, a sensing parameter component 735, a sensing measurement component 740, a channel estimate component 745, a node information component 750, a node selection component 755, or any combination thereof. Each of these components may communicate, directly or indirectly, with one another (e.g., via one or more buses).

Additionally, or alternatively, the communications manager 720 may support wireless communications at a roadside unit (RSU) in accordance with examples as disclosed herein. The sensing request component 725 may be configured as or otherwise support a means for transmitting, to a first communication node, a request for multi-static sensing capability information associated with the first communication node. The capability information component 730 may be configured as or otherwise support a means for receiving, from the first communication node, a report indicating the multi-static sensing capability information for the first communication node. The sensing parameter component 735 may be configured as or otherwise support a means for transmitting, to the first communication node and in response to receiving the multi-static sensing capability information, a control message indicating one or more multi-static sensing parameters for the first communication node. The sensing measurement component 740 may be configured as or otherwise support a means for receiving, from the first communication node, one or more multi-static sensing measurements obtained based on the one or more multi-static sensing parameters. The channel estimate component 745 may be configured as or otherwise support a means for transmitting, to the first communication node, a second communication node, or both, one or more channel estimates determined based on the one or more multi-static sensing measurements.

In some examples, the capability information component 730 may be configured as or otherwise support a means for receiving, from the first communication node, a report indicating updated multi-static sensing capability information. In some examples, the sensing parameter component 735 may be configured as or otherwise support a means for transmitting, to the first communication node, an update to the one or more multi-static sensing parameters.

In some examples, the node information component 750 may be configured as or otherwise support a means for receiving, from the first communication node, node information including location information, mobility information, orientation information, availability information, or any combination thereof, where the one or more multi-static sensing parameters are selected based on the node information.

In some examples, the sensing measurement component 740 may be configured as or otherwise support a means for receiving, from the first communication node, the one or more multi-static sensing measurements at periodic intervals.

In some examples, the sensing request component 725 may be configured as or otherwise support a means for transmitting the request for multi-static sensing capability information based on a trigger event associated with a coverage area of the RSU.

In some examples, the sensing measurement component 740 may be configured as or otherwise support a means for receiving, from the first communication node, one or more communication channel parameters associated with a group of communication nodes, an indication of a scattering element associated with a communication channel, an indication of a blocking element associated with the communication channel, a line of sight indication associated with the communication channel, a travel direction indication, or any combination thereof.

In some examples, the node selection component 755 may be configured as or otherwise support a means for selecting the first communication node as a node for multi-static sensing operations based on a coverage area, a location of the first communication node, an orientation of the first communication node, a communication node location density, a sensing mode to be used for the one or more multi-static sensing measurements, interference associated with the first communication node, or any combination thereof.

In some examples, the node selection component 755 may be configured as or otherwise support a means for selecting the first communication node as a node for multi-static sensing operations based on one or more sensing parameter estimates.

In some examples, the multi-static sensing capability information includes sensor capability information, availability information, coverage information, one or more transmission parameters, one or more reception parameters, a sensing mode, or any combination thereof.

In some examples, the one or more multi-static sensing parameters include an indication of one or more communication nodes, a sequence of one or more communication nodes, one or more transmission parameters, one or more reception parameters, a data format for channel estimates, an update rate, or any combination thereof.

In some examples, the capability information component 730 may be configured as or otherwise support a means for storing the multi-static sensing capability information in a database of multi-static sensing capability information.

Figure 8:
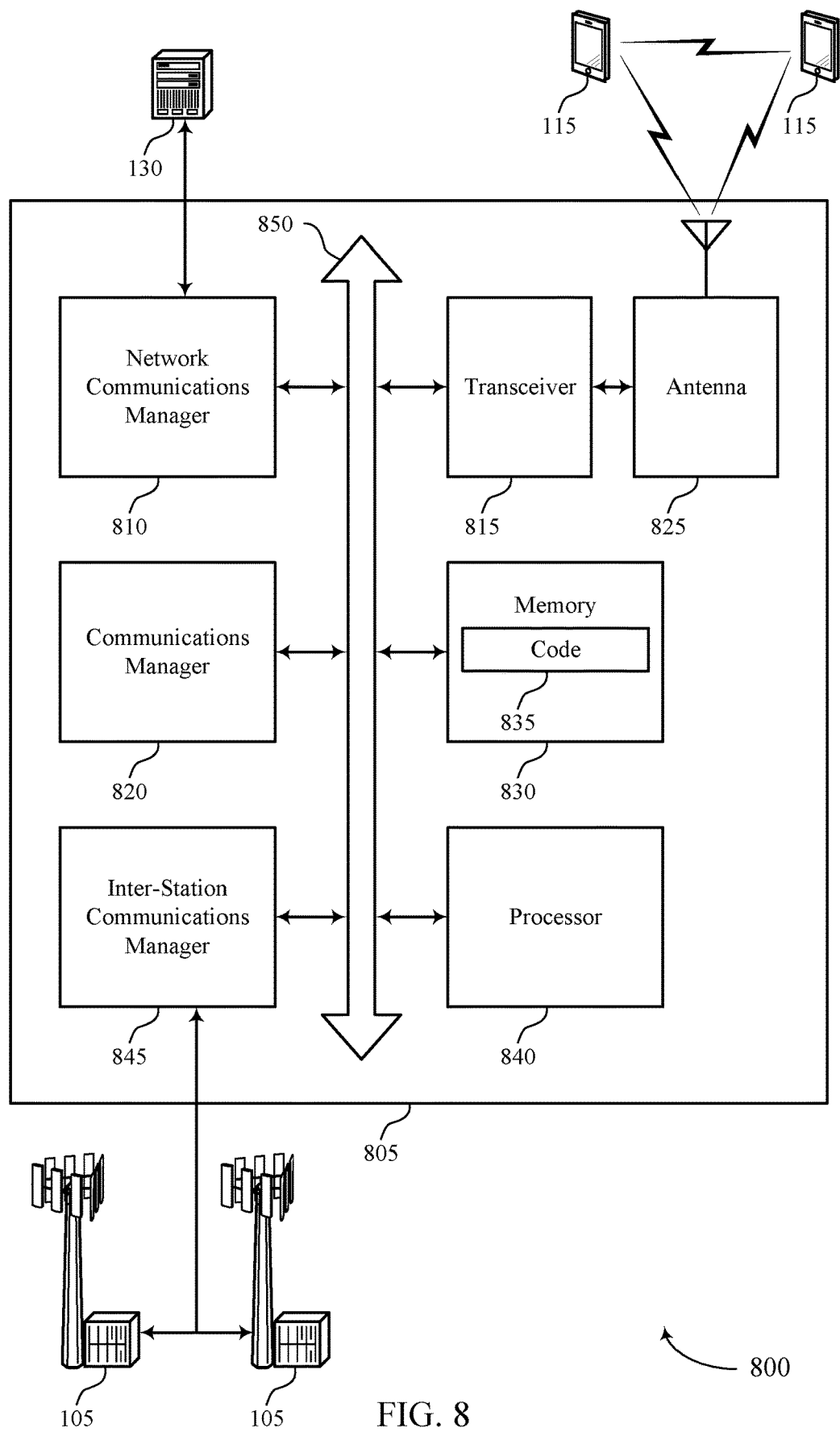
FIG. 8 shows a diagram of a system including a device that supports multi-static sensing coordination in accordance with examples described herein.

FIG. 8 shows a diagram of a system 800 including a device 805 that supports multi-static sensing coordination in accordance with examples described herein. The device 805 may be an example of or include the components of a device 505, a device 605, or a roadside unit as described herein. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting multi-static sensing coordination). For example, the device 805 or a component of the device 805 may include a processor 840 and memory 830 coupled with or to the processor 840, the processor 840 and memory 830 configured to perform various functions described herein.

The inter-station communications manager 845 may manage communications with other base stations or network entities 105, and may include a controller or scheduler for controlling communications with UEs 115 in cooperation with other base stations or network entities 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations or network entities 105.

Additionally, or alternatively, the communications manager 820 may support wireless communications at a roadside unit (RSU) in accordance with examples as disclosed herein. For example, the communications manager 820 may be configured as or otherwise support a means for transmitting, to a first communication node, a request for multi-static sensing capability information associated with the first communication node. The communications manager 820 may be configured as or otherwise support a means for receiving, from the first communication node, a report indicating the multi-static sensing capability information for the first communication node. The communications manager 820 may be configured as or otherwise support a means for transmitting, to the first communication node and in response to receiving the multi-static sensing capability information, a control message indicating one or more multi-static sensing parameters for the first communication node. The communications manager 820 may be configured as or otherwise support a means for receiving, from the first communication node, one or more multi-static sensing measurements obtained based on the one or more multi-static sensing parameters. The communications manager 820 may be configured as or otherwise support a means for transmitting, to the first communication node, a second communication node, or both, one or more channel estimates determined based on the one or more multi-static sensing measurements.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of multi-static sensing coordination as described herein, or the processor 840 and the memory 830 may be otherwise configured to perform or support such operations.

Figure 9:
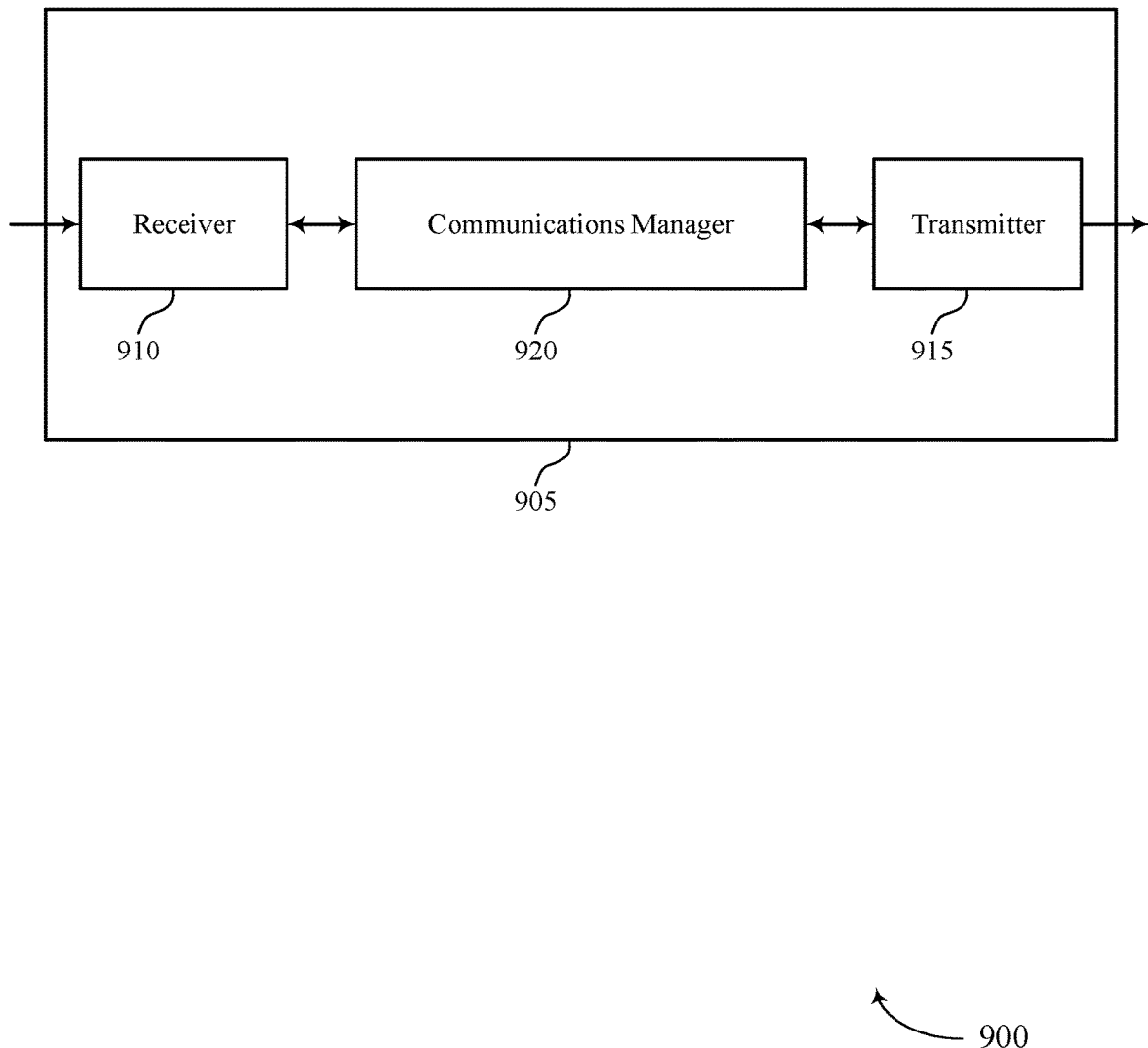
FIGS. 9 and 10 show block diagrams of devices that support multi-static sensing coordination in accordance with examples described herein.

FIG. 9 shows a block diagram 900 of a device 905 that supports multi-static sensing coordination in accordance with examples described herein. The device 905 may be an example of aspects of a communication node as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to multi-static sensing coordination). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to multi-static sensing coordination). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of multi-static sensing coordination as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

Additionally, or alternatively, the communications manager 920 may support wireless communications at a communication node in accordance with examples as disclosed herein. For example, the communications manager 920 may be configured as or otherwise support a means for receiving, from a roadside unit (RSU), a request for multi-static sensing capability information associated with the communication node. The communications manager 920 may be configured as or otherwise support a means for transmitting, to the RSU, a report indicating the multi-static sensing capability information associated with the communication node. The communications manager 920 may be configured as or otherwise support a means for receiving, from the RSU, a control message indicating one or more multi-static sensing parameters in response to transmitting the multi-static sensing capability information. The communications manager 920 may be configured as or otherwise support a means for transmitting, to the RSU, one or more multi-static sensing measurements obtained based on the one or more multi-static sensing parameters.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, more efficient utilization of communication resources, or a combination thereof.

Figure 10:
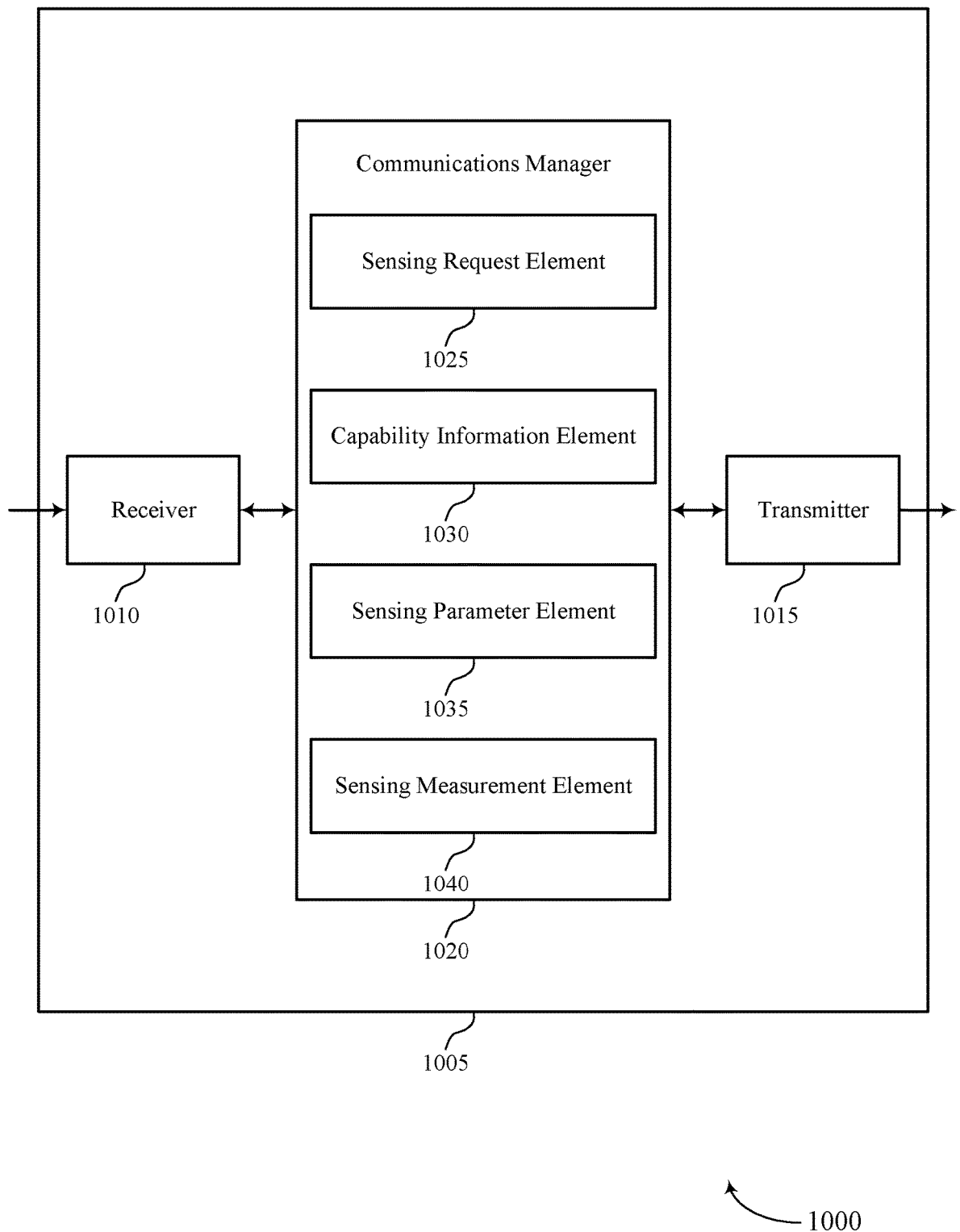

FIG. 10 shows a block diagram 1000 of a device 1005 that supports multi-static sensing coordination in accordance with examples described herein. The device 1005 may be an example of aspects of a device 905 or a communication node as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to multi-static sensing coordination). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to multi-static sensing coordination). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of multi-static sensing coordination as described herein. For example, the communications manager 1020 may include a sensing request element 1025, a capability information element 1030, a sensing parameter element 1035, a sensing measurement element 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a communication node in accordance with examples as disclosed herein. The sensing request element 1025 may be configured as or otherwise support a means for receiving, from a roadside unit (RSU), a request for multi-static sensing capability information associated with the communication node. The capability information element 1030 may be configured as or otherwise support a means for transmitting, to the RSU, a report indicating the multi-static sensing capability information associated with the communication node. The sensing parameter element 1035 may be configured as or otherwise support a means for receiving, from the RSU, a control message indicating one or more multi-static sensing parameters in response to transmitting the multi-static sensing capability information. The sensing measurement element 1040 may be configured as or otherwise support a means for transmitting, to the RSU, one or more multi-static sensing measurements obtained based on the one or more multi-static sensing parameters.

Figure 11:
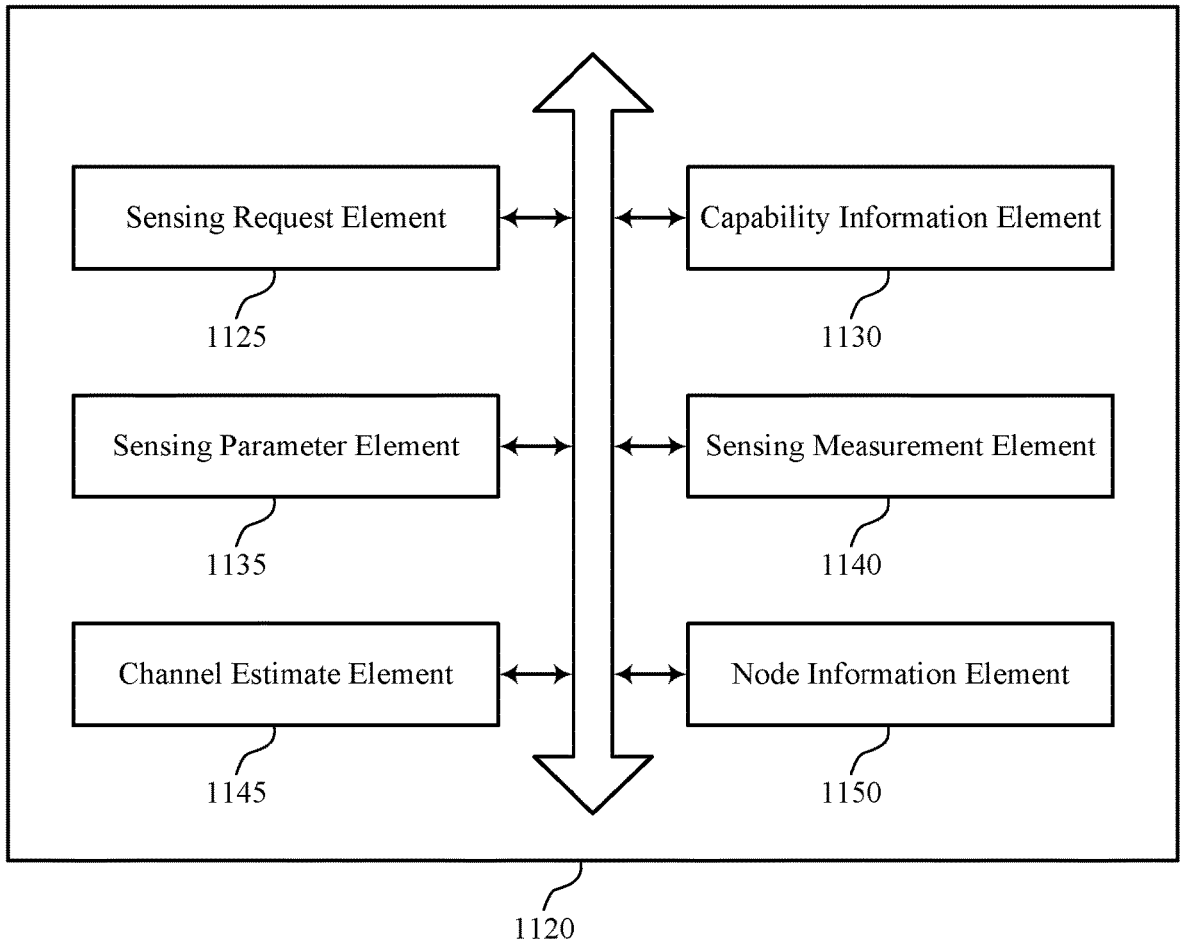
FIG. 11 shows a block diagram of a communications manager that supports multi-static sensing coordination in accordance with examples described herein.

FIG. 11 shows a block diagram 1100 of a communications manager 1120 that supports multi-static sensing coordination in accordance with examples described herein. The communications manager 1120 may be an example of aspects of a communications manager 920, a communications manager 1020, or both, as described herein. The communications manager 1120, or various components thereof, may be an example of means for performing various aspects of multi-static sensing coordination as described herein. For example, the communications manager 1120 may include a sensing request element 1125, a capability information element 1130, a sensing parameter element 1135, a sensing measurement element 1140, a channel estimate element 1145, a node information element 1150, or any combination thereof. Each of these components may communicate, directly or indirectly, with one another (e.g., via one or more buses).

Additionally, or alternatively, the communications manager 1120 may support wireless communications at a communication node in accordance with examples as disclosed herein. The sensing request element 1125 may be configured as or otherwise support a means for receiving, from a roadside unit (RSU), a request for multi-static sensing capability information associated with the communication node. The capability information element 1130 may be configured as or otherwise support a means for transmitting, to the RSU, a report indicating the multi-static sensing capability information associated with the communication node. The sensing parameter element 1135 may be configured as or otherwise support a means for receiving, from the RSU, a control message indicating one or more multi-static sensing parameters in response to transmitting the multi-static sensing capability information. The sensing measurement element 1140 may be configured as or otherwise support a means for transmitting, to the RSU, one or more multi-static sensing measurements obtained based on the one or more multi-static sensing parameters.

In some examples, the channel estimate element 1145 may be configured as or otherwise support a means for receiving, from the RSU, one or more channel estimates determined based on the one or more multi-static sensing measurements.

In some examples, the capability information element 1130 may be configured as or otherwise support a means for transmitting, to the RSU, a report indicating updated multi-static sensing capability information. In some examples, the sensing parameter element 1135 may be configured as or otherwise support a means for receiving, from the RSU, an update to the one or more multi-static sensing parameters.

In some examples, the node information element 1150 may be configured as or otherwise support a means for transmitting, to the RSU, node information including location information, mobility information, orientation information, availability information, or any combination thereof, where the one or more multi-static sensing parameters are selected based on the node information.

In some examples, the sensing measurement element 1140 may be configured as or otherwise support a means for transmitting, to the RSU, the one or more multi-static sensing measurements at periodic intervals.

In some examples, the sensing measurement element 1140 may be configured as or otherwise support a means for transmitting, to the RSU, one or more communication channel parameters associated with a group of communication nodes, an indication of a scattering element associated with a communication channel, an indication of a blocking element associated with the communication channel, a line of sight indication associated with the communication channel, a travel direction indication, or any combination thereof.

In some examples, the multi-static sensing capability information includes sensor capability information, availability information, coverage information, one or more transmission parameters, one or more reception parameters, a sensing mode, or any combination thereof.

In some examples, the one or more multi-static sensing parameters include an indication of one or more communication nodes, a sequence of one or more communication nodes, one or more transmission parameters, one or more reception parameters, a data format for channel estimates, an update rate, or any combination thereof.

Figure 12:
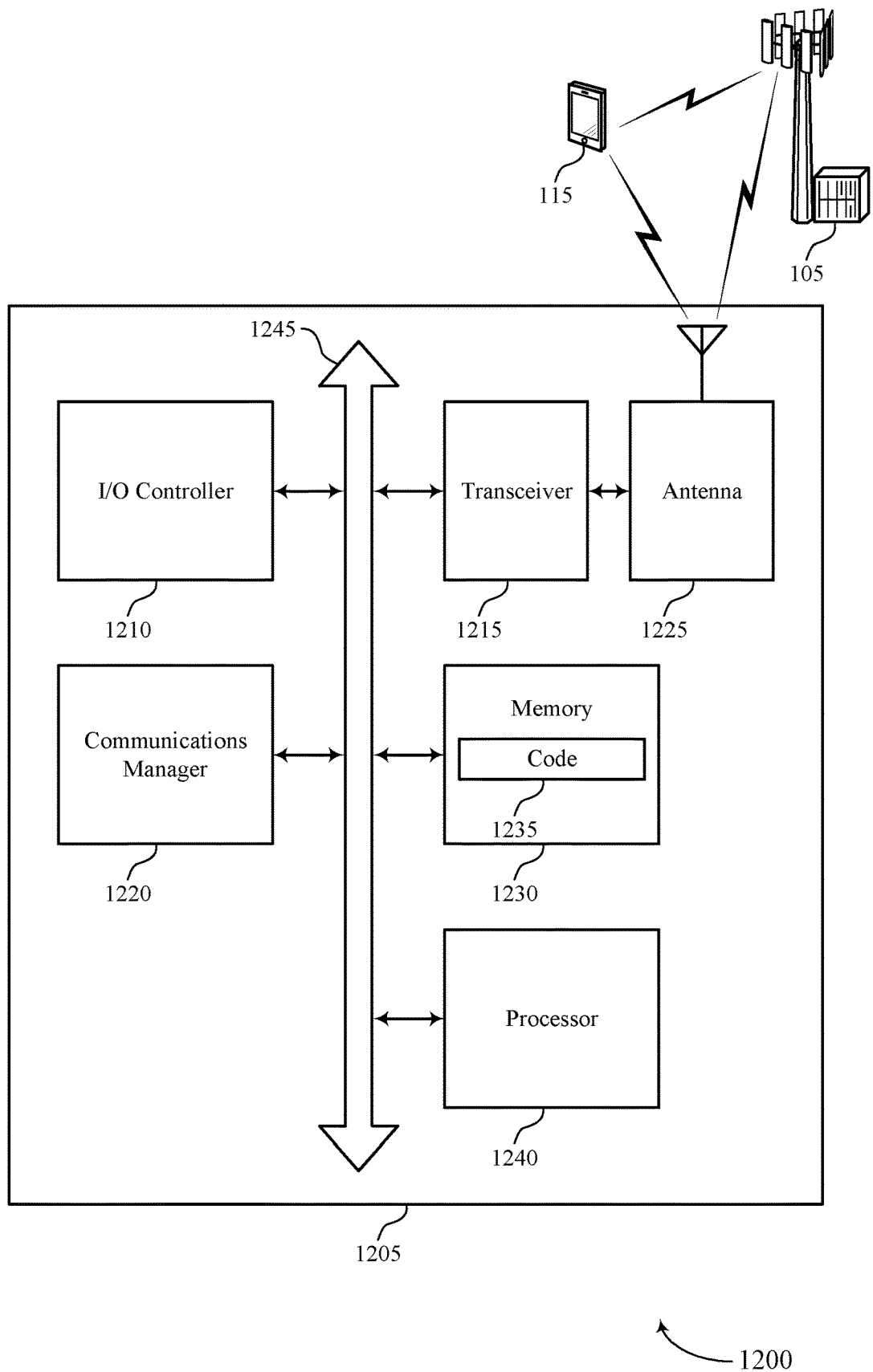
FIG. 12 shows a diagram of a system including a device that supports multi-static sensing coordination in accordance with examples described herein.

FIG. 12 shows a diagram of a system 1200 including a device 1205 that supports multi-static sensing coordination in accordance with examples described herein. The device 1205 may be an example of or include the components of a device 905, a device 1005, or a communication node as described herein. The device 1205 may include components for bi-directional voice and data communications including components for transmitting and receiving communications, such as a communications manager 1220, an I/O controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting multi-static sensing coordination). For example, the device 1205 or a component of the device 1205 may include a processor 1240 and memory 1230 coupled with or to the processor 1240, the processor 1240 and memory 1230 configured to perform various functions described herein.

Additionally, or alternatively, the communications manager 1220 may support wireless communications at a communication node in accordance with examples as disclosed herein. For example, the communications manager 1220 may be configured as or otherwise support a means for receiving, from a roadside unit (RSU), a request for multi-static sensing capability information associated with the communication node. The communications manager 1220 may be configured as or otherwise support a means for transmitting, to the RSU, a report indicating the multi-static sensing capability information associated with the communication node. The communications manager 1220 may be configured as or otherwise support a means for receiving, from the RSU, a control message indicating one or more multi-static sensing parameters in response to transmitting the multi-static sensing capability information. The communications manager 1220 may be configured as or otherwise support a means for transmitting, to the RSU, one or more multi-static sensing measurements obtained based on the one or more multi-static sensing parameters.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of multi-static sensing coordination as described herein, or the processor 1240 and the memory 1230 may be otherwise configured to perform or support such operations.

Figure 13:
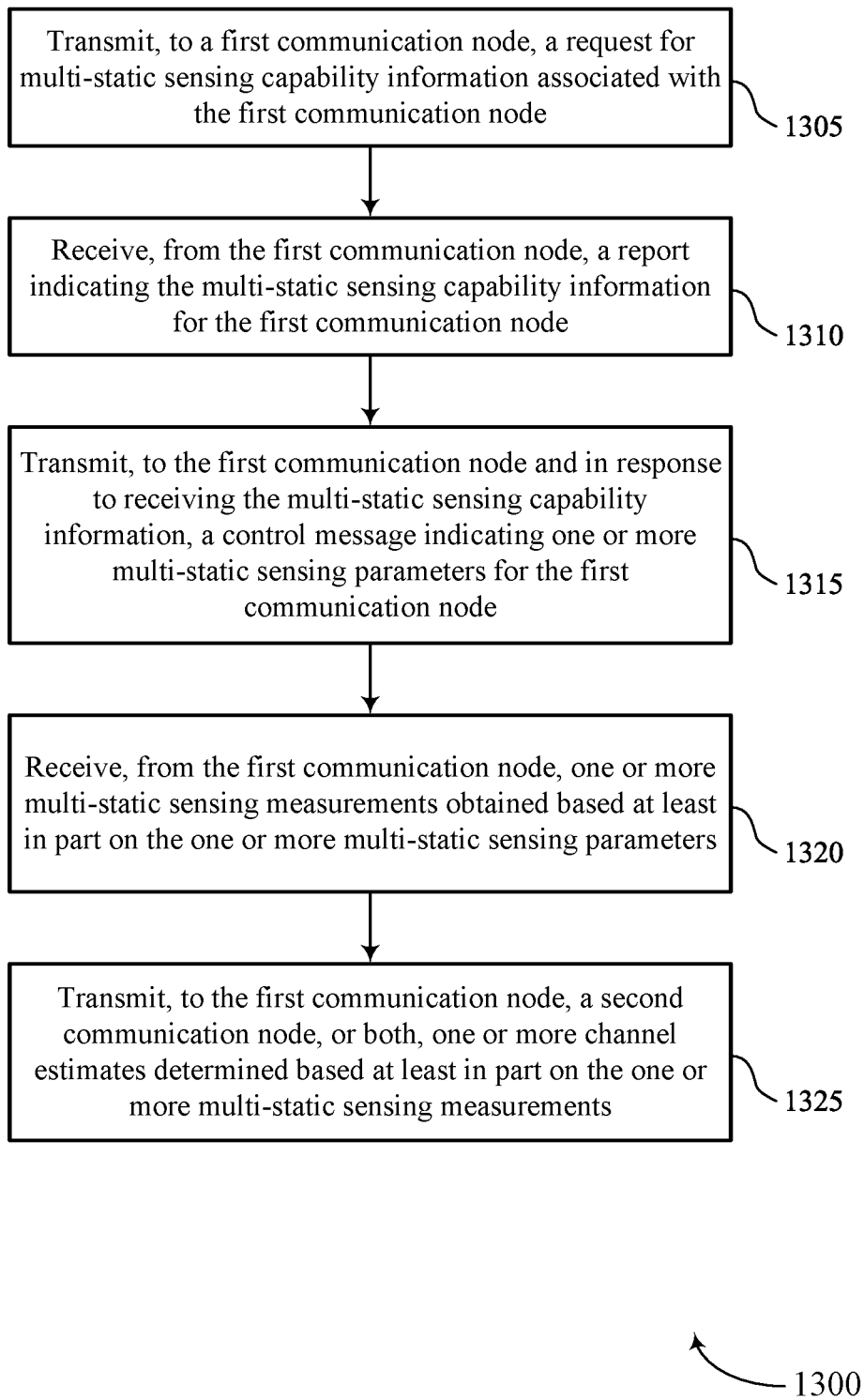
FIGS. 13 through 16 show flowcharts illustrating methods that support multi-static sensing coordination in accordance with examples described herein.

FIG. 13 shows a flowchart illustrating a method 1300 that supports multi-static sensing coordination in accordance with examples described herein. The operations of the method 1300 may be implemented by a roadside unit or its components as described herein. For example, the operations of the method 1300 may be performed by a roadside unit as described with reference to FIGS. 1 through 8. In some examples, a roadside unit may execute a set of instructions to control the functional elements of the roadside unit to perform the described functions. Additionally, or alternatively, the roadside unit may perform aspects of the described functions using special-purpose hardware.

At 1305, the method may include transmitting, to a first communication node, a request for multi-static sensing capability information associated with the first communication node. The operations of 1305 may be performed in accordance with examples as disclosed herein. In some examples, aspects of the operations of 1305 may be performed by a sensing request component 725 as described with reference to FIG. 7.

At 1310, the method may include receiving, from the first communication node, a report indicating the multi-static sensing capability information for the first communication node. The operations of 1310 may be performed in accordance with examples as disclosed herein. In some examples, aspects of the operations of 1310 may be performed by a capability information component 730 as described with reference to FIG. 7.

At 1315, the method may include transmitting, to the first communication node and in response to receiving the multi-static sensing capability information, a control message indicating one or more multi-static sensing parameters for the first communication node. The operations of 1315 may be performed in accordance with examples as disclosed herein. In some examples, aspects of the operations of 1315 may be performed by a sensing parameter component 735 as described with reference to FIG. 7.

At 1320, the method may include receiving, from the first communication node, one or more multi-static sensing measurements obtained based on the one or more multi-static sensing parameters. The operations of 1320 may be performed in accordance with examples as disclosed herein. In some examples, aspects of the operations of 1320 may be performed by a sensing measurement component 740 as described with reference to FIG. 7.

At 1325, the method may include transmitting, to the first communication node, a second communication node, or both, one or more channel estimates determined based on the one or more multi-static sensing measurements. The operations of 1325 may be performed in accordance with examples as disclosed herein. In some examples, aspects of the operations of 1325 may be performed by a channel estimate component 745 as described with reference to FIG. 7.

Figure 14:
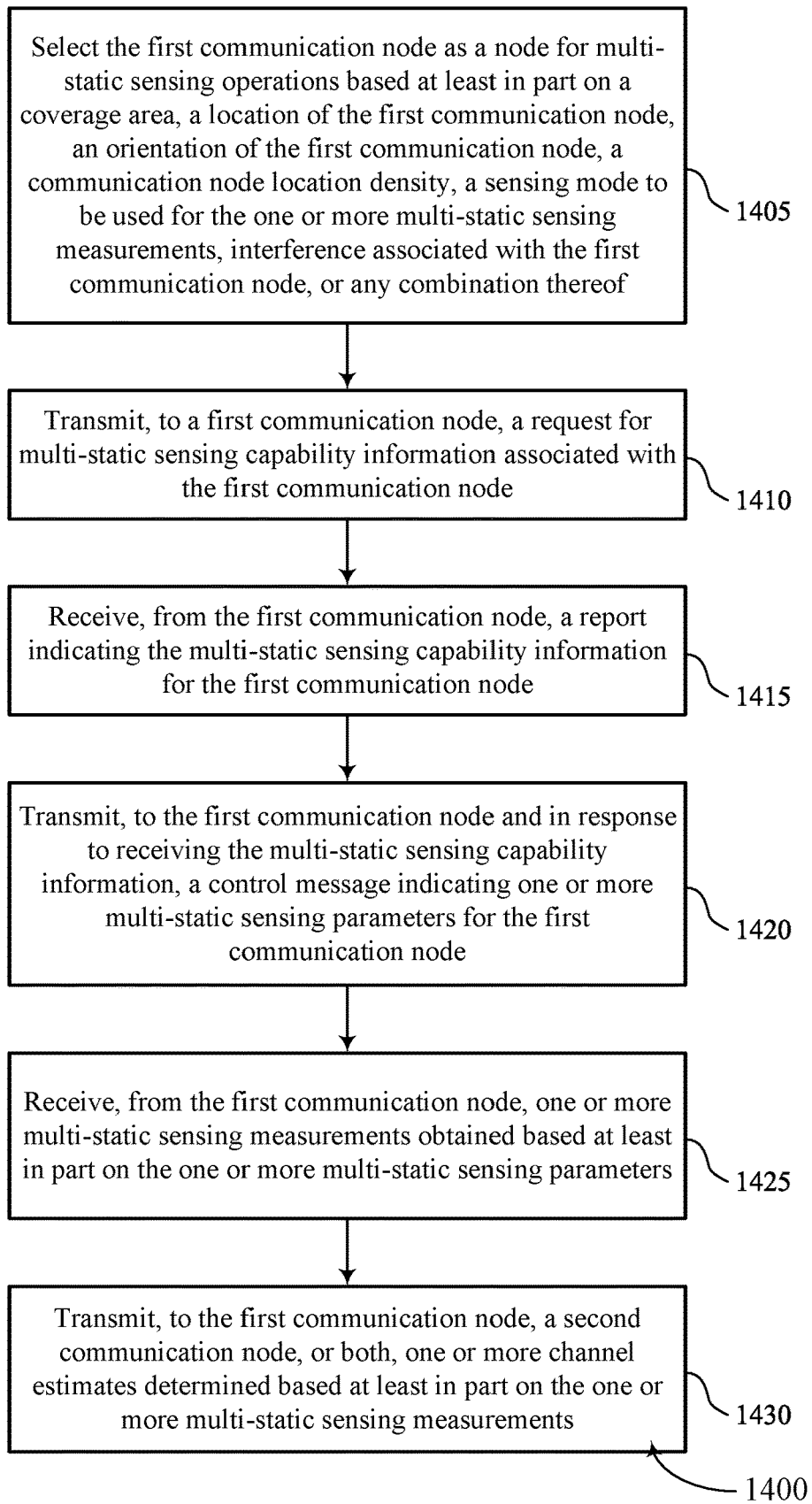

FIG. 14 shows a flowchart illustrating a method 1400 that supports multi-static sensing coordination in accordance with examples described herein. The operations of the method 1400 may be implemented by a roadside unit or its components as described herein. For example, the operations of the method 1400 may be performed by a roadside unit as described with reference to FIGS. 1 through 8. In some examples, a roadside unit may execute a set of instructions to control the functional elements of the roadside unit to perform the described functions. Additionally, or alternatively, the roadside unit may perform aspects of the described functions using special-purpose hardware.

At 1405, the method may include selecting the first communication node as a node for multi-static sensing operations based on a coverage area, a location of the first communication node, an orientation of the first communication node, a communication node location density, a sensing mode to be used for the one or more multi-static sensing measurements, interference associated with the first communication node, or any combination thereof. The operations of 1405 may be performed in accordance with examples as disclosed herein. In some examples, aspects of the operations of 1405 may be performed by a node selection component 755 as described with reference to FIG. 7.

At 1410, the method may include transmitting, to a first communication node, a request for multi-static sensing capability information associated with the first communication node. The operations of 1410 may be performed in accordance with examples as disclosed herein. In some examples, aspects of the operations of 1410 may be performed by a sensing request component 725 as described with reference to FIG. 7.

At 1415, the method may include receiving, from the first communication node, a report indicating the multi-static sensing capability information for the first communication node. The operations of 1415 may be performed in accordance with examples as disclosed herein. In some examples, aspects of the operations of 1415 may be performed by a capability information component 730 as described with reference to FIG. 7.

At 1420, the method may include transmitting, to the first communication node and in response to receiving the multi-static sensing capability information, a control message indicating one or more multi-static sensing parameters for the first communication node. The operations of 1420 may be performed in accordance with examples as disclosed herein. In some examples, aspects of the operations of 1420 may be performed by a sensing parameter component 735 as described with reference to FIG. 7.

At 1425, the method may include receiving, from the first communication node, one or more multi-static sensing measurements obtained based on the one or more multi-static sensing parameters. The operations of 1425 may be performed in accordance with examples as disclosed herein. In some examples, aspects of the operations of 1425 may be performed by a sensing measurement component 740 as described with reference to FIG. 7.

At 1430, the method may include transmitting, to the first communication node, a second communication node, or both, one or more channel estimates determined based on the one or more multi-static sensing measurements. The operations of 1430 may be performed in accordance with examples as disclosed herein. In some examples, aspects of the operations of 1430 may be performed by a channel estimate component 745 as described with reference to FIG. 7.

Figure 15:
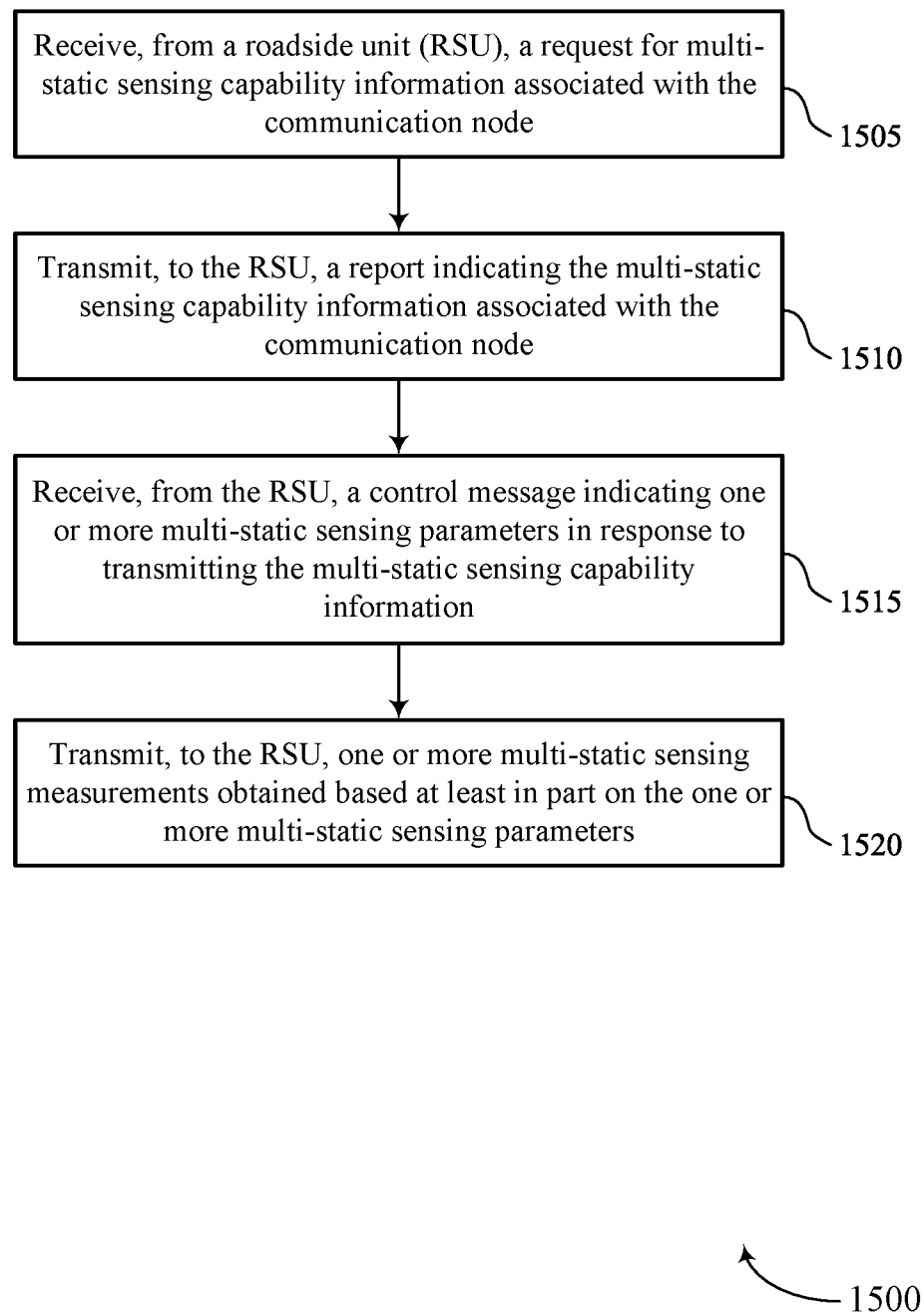

FIG. 15 shows a flowchart illustrating a method 1500 that supports multi-static sensing coordination in accordance with examples described herein. The operations of the method 1500 may be implemented by a communication node or its components as described herein. For example, the operations of the method 1500 may be performed by a communication node as described with reference to FIGS. 1 through 4 and 9 through 12. In some examples, a communication node may execute a set of instructions to control the functional elements of the communication node to perform the described functions. Additionally, or alternatively, the communication node may perform aspects of the described functions using special-purpose hardware.

At 1505, the method may include receiving, from a roadside unit (RSU), a request for multi-static sensing capability information associated with the communication node. The operations of 1505 may be performed in accordance with examples as disclosed herein. In some examples, aspects of the operations of 1505 may be performed by a sensing request element 1125 as described with reference to FIG. 11.

At 1510, the method may include transmitting, to the RSU, a report indicating the multi-static sensing capability information associated with the communication node. The operations of 1510 may be performed in accordance with examples as disclosed herein. In some examples, aspects of the operations of 1510 may be performed by a capability information element 1130 as described with reference to FIG. 11.

At 1515, the method may include receiving, from the RSU, a control message indicating one or more multi-static sensing parameters in response to transmitting the multi-static sensing capability information. The operations of 1515 may be performed in accordance with examples as disclosed herein. In some examples, aspects of the operations of 1515 may be performed by a sensing parameter element 1135 as described with reference to FIG. 11.

At 1520, the method may include transmitting, to the RSU, one or more multi-static sensing measurements obtained based on the one or more multi-static sensing parameters. The operations of 1520 may be performed in accordance with examples as disclosed herein. In some examples, aspects of the operations of 1520 may be performed by a sensing measurement element 1140 as described with reference to FIG. 11.

Figure 16:
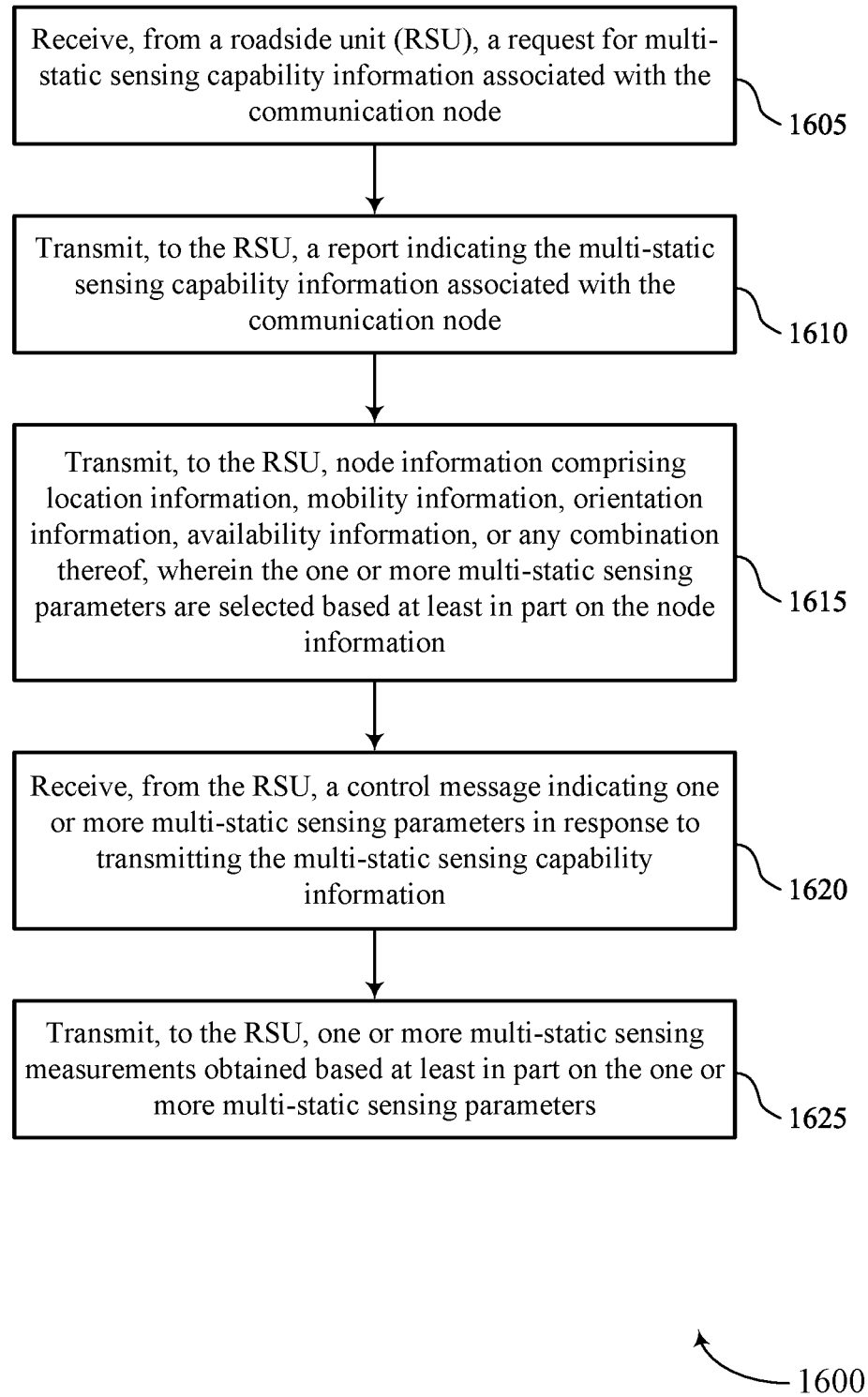

FIG. 16 shows a flowchart illustrating a method 1600 that supports multi-static sensing coordination in accordance with examples described herein. The operations of the method 1600 may be implemented by a communication node or its components as described herein. For example, the operations of the method 1600 may be performed by a communication node as described with reference to FIGS. 1 through 4 and 9 through 12. In some examples, a communication node may execute a set of instructions to control the functional elements of the communication node to perform the described functions. Additionally, or alternatively, the communication node may perform aspects of the described functions using special-purpose hardware.

At 1605, the method may include receiving, from a roadside unit (RSU), a request for multi-static sensing capability information associated with the communication node. The operations of 1605 may be performed in accordance with examples as disclosed herein. In some examples, aspects of the operations of 1605 may be performed by a sensing request element 1125 as described with reference to FIG. 11.

At 1610, the method may include transmitting, to the RSU, a report indicating the multi-static sensing capability information associated with the communication node. The operations of 1610 may be performed in accordance with examples as disclosed herein. In some examples, aspects of the operations of 1610 may be performed by a capability information element 1130 as described with reference to FIG. 11.

At 1615, the method may include transmitting, to the RSU, node information including location information, mobility information, orientation information, availability information, or any combination thereof, where the one or more multi-static sensing parameters are selected based on the node information. The operations of 1615 may be performed in accordance with examples as disclosed herein. In some examples, aspects of the operations of 1615 may be performed by a node information element 1150 as described with reference to FIG. 11.

At 1620, the method may include receiving, from the RSU, a control message indicating one or more multi-static sensing parameters in response to transmitting the multi-static sensing capability information. The operations of 1620 may be performed in accordance with examples as disclosed herein. In some examples, aspects of the operations of 1620 may be performed by a sensing parameter element 1135 as described with reference to FIG. 11.

At 1625, the method may include transmitting, to the RSU, one or more multi-static sensing measurements obtained based on the one or more multi-static sensing parameters. The operations of 1625 may be performed in accordance with examples as disclosed herein. In some examples, aspects of the operations of 1625 may be performed by a sensing measurement element 1140 as described with reference to FIG. 11.

The following provides an overview of aspects of the present disclosure:

Aspect 1: A method for wireless communications at a roadside unit (RSU), comprising: transmitting, to a first communication node, a request for multi-static sensing capability information associated with the first communication node; receiving, from the first communication node, a report indicating the multi-static sensing capability information for the first communication node; transmitting, to the first communication node and in response to receiving the multi-static sensing capability information, a control message indicating one or more multi-static sensing parameters for the first communication node; receiving, from the first communication node, one or more multi-static sensing measurements obtained based at least in part on the one or more multi-static sensing parameters; and transmitting, to the first communication node, a second communication node, or both, one or more channel estimates determined based at least in part on the one or more multi-static sensing measurements.

Aspect 2: The method of aspect 1, further comprising: receiving, from the first communication node, a report indicating updated multi-static sensing capability information; and transmitting, to the first communication node, an update to the one or more multi-static sensing parameters.

Aspect 3: The method of any of aspects 1 through 2, further comprising: receiving, from the first communication node, node information comprising location information, mobility information, orientation information, availability information, or any combination thereof, wherein the one or more multi-static sensing parameters are selected based at least in part on the node information.

Aspect 4: The method of any of aspects 1 through 3, further comprising: receiving, from the first communication node, the one or more multi-static sensing measurements at periodic intervals.

Aspect 5: The method of any of aspects 1 through 4, further comprising: transmitting the request for multi-static sensing capability information based on a trigger event associated with a coverage area of the RSU.

Aspect 6: The method of any of aspects 1 through 5, further comprising: receiving, from the first communication node, one or more communication channel parameters associated with a group of communication nodes, an indication of a scattering element associated with a communication channel, an indication of a blocking element associated with the communication channel, a line of sight indication associated with the communication channel, a travel direction indication, or any combination thereof.

Aspect 7: The method of any of aspects 1 through 6, further comprising: selecting the first communication node as a node for multi-static sensing operations based at least in part on a coverage area, a location of the first communication node, an orientation of the first communication node, a communication node location density, a sensing mode to be used for the one or more multi-static sensing measurements, interference associated with the first communication node, or any combination thereof.

Aspect 8: The method of any of aspects 1 through 7, further comprising: selecting the first communication node as a node for multi-static sensing operations based at least in part on one or more sensing parameter estimates.

Aspect 9: The method of any of aspects 1 through 8, wherein the multi-static sensing capability information comprises sensor capability information, availability information, coverage information, one or more transmission parameters, one or more reception parameters, a sensing mode, or any combination thereof.

Aspect 10: The method of any of aspects 1 through 9, wherein the one or more multi-static sensing parameters include an indication of one or more communication nodes, a sequence of one or more communication nodes, one or more transmission parameters, one or more reception parameters, a data format for channel estimates, an update rate, or any combination thereof.

Aspect 11: The method of any of aspects 1 through 10, further comprising: storing the multi-static sensing capability information in a database of multi-static sensing capability information.

Aspect 12: A method for wireless communications at a communication node, comprising: receiving, from a roadside unit (RSU), a request for multi-static sensing capability information associated with the communication node; transmitting, to the RSU, a report indicating the multi-static sensing capability information associated with the communication node; receiving, from the RSU, a control message indicating one or more multi-static sensing parameters in response to transmitting the multi-static sensing capability information; and transmitting, to the RSU, one or more multi-static sensing measurements obtained based at least in part on the one or more multi-static sensing parameters.

Aspect 13: The method of aspect 12, further comprising: receiving, from the RSU, one or more channel estimates determined based at least in part on the one or more multi-static sensing measurements.

Aspect 14: The method of any of aspects 12 through 13, further comprising: transmitting, to the RSU, a report indicating updated multi-static sensing capability information; and receiving, from the RSU, an update to the one or more multi-static sensing parameters.

Aspect 15: The method of any of aspects 12 through 14, further comprising: transmitting, to the RSU, node information comprising location information, mobility information, orientation information, availability information, or any combination thereof, wherein the one or more multi-static sensing parameters are selected based at least in part on the node information.

Aspect 16: The method of any of aspects 12 through 15, further comprising: transmitting, to the RSU, the one or more multi-static sensing measurements at periodic intervals.

Aspect 17: The method of any of aspects 12 through 16, further comprising: transmitting, to the RSU, one or more communication channel parameters associated with a group of communication nodes, an indication of a scattering element associated with a communication channel, an indication of a blocking element associated with the communication channel, a line of sight indication associated with the communication channel, a travel direction indication, or any combination thereof.

Aspect 18: The method of any of aspects 12 through 17, wherein the multi-static sensing capability information comprises sensor capability information, availability information, coverage information, one or more transmission parameters, one or more reception parameters, a sensing mode, or any combination thereof.

Aspect 19: The method of any of aspects 12 through 18, wherein the one or more multi-static sensing parameters include an indication of one or more communication nodes, a sequence of one or more communication nodes, one or more transmission parameters, one or more reception parameters, a data format for channel estimates, an update rate, or any combination thereof.

Aspect 20: An apparatus for wireless communications at a roadside unit (RSU), comprising: a processor; memory coupled with the processor; and instructions stored in the memory and executable by the processor to cause the apparatus to perform a method of any of aspects 1 through 11.

Aspect 21: An apparatus for wireless communications at a roadside unit (RSU), comprising at least one means for performing a method of any of aspects 1 through 11.

Aspect 22: A non-transitory computer-readable medium storing code for wireless communications at a roadside unit (RSU), the code comprising instructions executable by a processor to perform a method of any of aspects 1 through 11.

Aspect 23: An apparatus for wireless communications at a communication node, comprising a processor; memory coupled with the processor; and instructions stored in the memory and executable by the processor to cause the apparatus to perform a method of any of aspects 12 through 19.

Aspect 24: An apparatus for wireless communications at a communication node, comprising at least one means for performing a method of any of aspects 12 through 19.

Aspect 25: A non-transitory computer-readable medium storing code for wireless communications at a communication node, the code comprising instructions executable by a processor to perform a method of any of aspects 12 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a roadside unit (RSU), comprising:
    a processor;
    memory coupled with the processor; and
    instructions stored in the memory and executable by the processor to cause the apparatus to:
        transmit, to a first communication node, a request for multi-static sensing capability information associated with the first communication node;
        receive, from the first communication node, a report indicating the multi-static sensing capability information for the first communication node;
        transmit, to the first communication node and in response to receiving the multi-static sensing capability information, a control message indicating one or more multi-static sensing parameters for the first communication node;
        receive, from the first communication node, one or more multi-static sensing measurements obtained based at least in part on the one or more multi-static sensing parameters; and
        transmit, to the first communication node, a second communication node, or both, one or more channel estimates determined based at least in part on the one or more multi-static sensing measurements.

2. The apparatus of claim 1, wherein the instructions are further executable by the processor to cause the apparatus to:
    receive, from the first communication node, a report indicating updated multi-static sensing capability information; and
    transmit, to the first communication node, an update to the one or more multi-static sensing parameters.

3. The apparatus of claim 1, wherein the instructions are further executable by the processor to cause the apparatus to:
    receive, from the first communication node, node information comprising location information, mobility information, orientation information, availability information, or any combination thereof, wherein the one or more multi-static sensing parameters are selected based at least in part on the node information.

4. The apparatus of claim 1, wherein the instructions are further executable by the processor to cause the apparatus to:
receive, from the first communication node, the one or more multi-static sensing measurements at periodic intervals.

5. The apparatus of claim 1, wherein the instructions are further executable by the processor to cause the apparatus to:
transmit the request for multi-static sensing capability information based on a trigger event associated with a coverage area of the RSU.

6. The apparatus of claim 1, wherein the instructions are further executable by the processor to cause the apparatus to:
receive, from the first communication node, one or more communication channel parameters associated with a group of communication nodes, an indication of a scattering element associated with a communication channel, an indication of a blocking element associated with the communication channel, a line of sight indication associated with the communication channel, a travel direction indication, or any combination thereof.

7. The apparatus of claim 1, wherein the instructions are further executable by the processor to cause the apparatus to:
select the first communication node as a node for multi-static sensing operations based at least in part on a coverage area, a location of the first communication node, an orientation of the first communication node, a communication node location density, a sensing mode to be used for the one or more multi-static sensing measurements, interference associated with the first communication node, or any combination thereof.

8. The apparatus of claim 1, wherein the instructions are further executable by the processor to cause the apparatus to:
select the first communication node as a node for multi-static sensing operations based at least in part on one or more sensing parameter estimates.

9. The apparatus of claim 1, wherein the multi-static sensing capability information comprises sensor capability information, availability information, coverage information, one or more transmission parameters, one or more reception parameters, a sensing mode, or any combination thereof.

10. The apparatus of claim 1, wherein the one or more multi-static sensing parameters include an indication of one or more communication nodes, a sequence of one or more communication nodes, one or more transmission parameters, one or more reception parameters, a data format for channel estimates, an update rate, or any combination thereof.

11. The apparatus of claim 1, wherein the instructions are further executable by the processor to cause the apparatus to:
store the multi-static sensing capability information in a database of multi-static sensing capability information.

12. An apparatus for wireless communications at a communication node, comprising:
a processor;
memory coupled with the processor; and
instructions stored in the memory and executable by the processor to cause the apparatus to:
receive, from a roadside unit (RSU), a request for multi-static sensing capability information associated with the communication node;
transmit, to the RSU, a report indicating the multi-static sensing capability information associated with the communication node;
receive, from the RSU, a control message indicating one or more multi-static sensing parameters in response to transmitting the multi-static sensing capability information; and
transmit, to the RSU, one or more multi-static sensing measurements obtained based at least in part on the one or more multi-static sensing parameters.

13. The apparatus of claim 12, wherein the instructions are further executable by the processor to cause the apparatus to:
receive, from the RSU, one or more channel estimates determined based at least in part on the one or more multi-static sensing measurements.

14. The apparatus of claim 12, wherein the instructions are further executable by the processor to cause the apparatus to:
transmit, to the RSU, a report indicating updated multi-static sensing capability information; and
receive, from the RSU, an update to the one or more multi-static sensing parameters.

15. The apparatus of claim 12, wherein the instructions are further executable by the processor to cause the apparatus to:
transmit, to the RSU, node information comprising location information, mobility information, orientation information, availability information, or any combination thereof, wherein the one or more multi-static sensing parameters are selected based at least in part on the node information.

16. The apparatus of claim 12, wherein the instructions are further executable by the processor to cause the apparatus to:
transmit, to the RSU, the one or more multi-static sensing measurements at periodic intervals.

17. The apparatus of claim 12, wherein the instructions are further executable by the processor to cause the apparatus to:
transmit, to the RSU, one or more communication channel parameters associated with a group of communication nodes, an indication of a scattering element associated with a communication channel, an indication of a blocking element associated with the communication channel, a line of sight indication associated with the communication channel, a travel direction indication, or any combination thereof.

18. The apparatus of claim 12, wherein the multi-static sensing capability information comprises sensor capability information, availability information, coverage information, one or more transmission parameters, one or more reception parameters, a sensing mode, or any combination thereof.

19. The apparatus of claim 12, wherein the one or more multi-static sensing parameters include an indication of one or more communication nodes, a sequence of one or more communication nodes, one or more transmission parameters, one or more reception parameters, a data format for channel estimates, an update rate, or any combination thereof.

20. A method for wireless communications at a roadside unit (RSU), comprising:
transmitting, to a first communication node, a request for multi-static sensing capability information associated with the first communication node;
receiving, from the first communication node, a report indicating the multi-static sensing capability information for the first communication node;
transmitting, to the first communication node and in response to receiving the multi-static sensing capability information, a control message indicating one or more multi-static sensing parameters for the first communication node;

receiving, from the first communication node, one or more multi-static sensing measurements obtained based at least in part on the one or more multi-static sensing parameters; and transmitting, to the first communication node, a second communication node, or both, one or more channel estimates determined based at least in part on the one or more multi-static sensing measurements.

21. The method of claim 20, further comprising:

receiving, from the first communication node, a report indicating updated multi-static sensing capability information; and transmitting, to the first communication node, an update to the one or more multi-static sensing parameters.

22. The method of claim 20, further comprising:

receiving, from the first communication node, node information comprising location information, mobility information, orientation information, availability information, or any combination thereof, wherein the one or more multi-static sensing parameters are selected based at least in part on the node information.

23. The method of claim 20, further comprising:

receiving, from the first communication node, one or more communication channel parameters associated with a group of communication nodes, an indication of a scattering element associated with a communication channel, an indication of a blocking element associated with the communication channel, a line of sight indication associated with the communication channel, a travel direction indication, or any combination thereof.

24. The method of claim 20, further comprising:

selecting the first communication node as a node for multi-static sensing operations based at least in part on a coverage area, a location of the first communication node, an orientation of the first communication node, a communication node location density, a sensing mode to be used for the one or more multi-static sensing measurements, interference associated with the first communication node, or any combination thereof.

25. A method for wireless communications at a communication node, comprising:

receiving, from a roadside unit (RSU), a request for multi-static sensing capability information associated with the communication node;

transmitting, to the RSU, a report indicating the multi-static sensing capability information associated with the communication node;

receiving, from the RSU, a control message indicating one or more multi-static sensing parameters in response to transmitting the multi-static sensing capability information; and transmitting, to the RSU, one or more multi-static sensing measurements obtained based at least in part on the one or more multi-static sensing parameters.

26. The method of claim 25, further comprising:

receiving, from the RSU, one or more channel estimates determined based at least in part on the one or more multi-static sensing measurements.

27. The method of claim 25, further comprising:

transmitting, to the RSU, node information comprising location information, mobility information, orientation information, availability information, or any combination thereof, wherein the one or more multi-static sensing parameters are selected based at least in part on the node information.

28. The method of claim 25, further comprising:

transmitting, to the RSU, one or more communication channel parameters associated with a group of communication nodes, an indication of a scattering element associated with a communication channel, an indication of a blocking element associated with the communication channel, a line of sight indication associated with the communication channel, a travel direction indication, or any combination thereof.

29. The method of claim 25, wherein the multi-static sensing capability information comprises sensor capability information, availability information, coverage information, one or more transmission parameters, one or more reception parameters, a sensing mode, or any combination thereof.

30. The method of claim 25, wherein the one or more multi-static sensing parameters include an indication of one or more communication nodes, a sequence of one or more communication nodes, one or more transmission parameters, one or more reception parameters, a data format for channel estimates, an update rate, or any combination thereof.

* * * * *